US009366775B2

(12) United States Patent
Hung et al.

(10) Patent No.: US 9,366,775 B2
(45) Date of Patent: Jun. 14, 2016

(54) SEISMIC DATA PROCESSING INCLUDING INTERNAL MULTIPLE MODELING WITHOUT SUBSURFACE INFORMATION

(71) Applicant: CGGVERITAS SERVICES SA, Massy Cedex (FR)

(72) Inventors: Barry Hung, Singapore (SG); Min Wang, Singapore (SG)

(73) Assignee: CGG SERVICES SA, Massy (FR)

( * ) Notice: Subject to any disclaimer, the term of this patent is extended or adjusted under 35 U.S.C. 154(b) by 666 days.

(21) Appl. No.: 13/739,489

(22) Filed: Jan. 11, 2013

(65) Prior Publication Data

US 2013/0182535 A1    Jul. 18, 2013

Related U.S. Application Data

(60) Provisional application No. 61/585,830, filed on Jan. 12, 2012.

(51) Int. Cl.
*G01V 1/38* (2006.01)
*G01V 1/36* (2006.01)

(52) U.S. Cl.
CPC ....... *G01V 1/38* (2013.01); *G01V 1/364* (2013.01); *G01V 2210/56* (2013.01)

(58) Field of Classification Search
CPC ........... G01V 1/36; G01V 1/38; G01V 1/364; G01V 1/3808; G01V 2210/56
USPC ..................................................... 367/21, 24
See application file for complete search history.

(56) References Cited

U.S. PATENT DOCUMENTS

2012/0041682 A1*    2/2012  Ramirez-Perez et al. ...... 702/17

FOREIGN PATENT DOCUMENTS

WO        2012021218 A2      2/2012

OTHER PUBLICATIONS

Ilana Erez et al., "The Concept of Virtual Events: Attenuation of Internal Multiples", SEG/New Orleans 2006 Annual Meeting, pp. 2714-2716.
Barry Hung et al., "Internal Demultiple Methodology Without Identifying the Multiple Generators", SEG Las Vegas 2012 Annual Meeting, pp. 1-5.
GB Search Report mailed Jun. 26, 2013 in related GB Application No. 1300498.1.
Qiang Fu et al., "The Inverse Scattering Series Approach Towards the Elimination of Land Internal Multiples," 80th Meeting, SEG, Denver Colorado, Oct. 17-22, 2010, pp. 3456-3461.
Malcolm Griffiths et al., "Applications of Inter-Bed Multiple Attenuation," Special Section: Multiple Attenuation, The Leading Edge, Aug. 2011, pp. 906-912.

(Continued)

*Primary Examiner* — Ian J Lobo
(74) *Attorney, Agent, or Firm* — Patent Portfolio Builders PLLC

(57) ABSTRACT

A system and method are disclosed for substantially eliminating the influence of internal multiples when seismic mapping under-water geographical areas of interest without a priori knowledge of subsurface information. The system and method iteratively locate multiple-generating horizons for predicting internal multiples and uses a lower-higher-lower relationship between the multiple generating horizons. The system and method provide an appropriate and cost-effective means for internal multiple attenuation without subsurface information.

14 Claims, 18 Drawing Sheets

(56) References Cited

OTHER PUBLICATIONS

P. Hugonnet et al., "2D Deconvolution for OBC Data and for Internal Multiple Attenuation—Part 1: Theory," 67th Meeting, EAGE, Madrid Spain, Jun. 13-16, 2005, Paper A026.

H. Jakubowicz, "Wave Equation Prediction and Removal of Inter-Bed Multiple," 68th Meeting, SEG, Extended Abstracts, 1998, pp. 1527-1530.

Stewart A. Levin, "Delft Inverse Scattering Surface-Related Multiple Attenuation in Three Lines," 78th Meeting, SEG, Extended Abstracts, Nov. 9-14, 2008, pp. 2512-2515.

K.H. Matson et al., "Comparing the Interface and Point Scatterer Methods for Attenuating Internal Multiples: A Study with Synthetic Data—Part II," 68th Meeting, SEG, 1998, Extended Abstracts, pp. 1523-1526.

Bogdan G. Nita et al., "Inverse Scattering Internal Multiple Attenuation Algorithm: An Analysis of the Pseudo-Depth and Time Monotonicity Requirements," 77th Meeting, SEG, San Antonio, Texas, Sep. 23-28, 2007, Expanded Abstracts, pp. 2461-2464.

Einar Otnes et al., "Attenuation of Internal Multiples for Multicomponent and Towed Streamer Data," 74th Meeting, SEG, Denver, Colorado, Oct. 10-15, 2004, Extended Abstracts, p. 1297-1300.

Antonio Pica et al., "Wave Equation Based Internal Multiple Modeling in 3D," 78th Meeting, SEG, Nov. 9-14, 2008, Expanded Abstracts, pp. 2476-2480.

D.J. Verschuur et al., "Removal of Interbed Multiples," 58th Meeting, EAGE, Amsterdam, The Netherlands, Jun. 3-7, 1996, Expanded Abstracts, Paper B003.

D.J. Verschuur et al., "A Comparison of the Feedback and Inverse Scattering Internal Multiple Attenuation Methods," 61st Meeting, EAGE, Helsinki, Finland, Jun. 7-11, 1999, Extended Abstracts, pp. 1-14.

A. B. Weglein et al., 1997, "An Inverse-Scattering Series Method for Attenuating Multiples in Seismic Reflection Data," Geophysics, 62, No. 6, Nov.-Dec. 1997, pp. 1975-1989.

\* cited by examiner

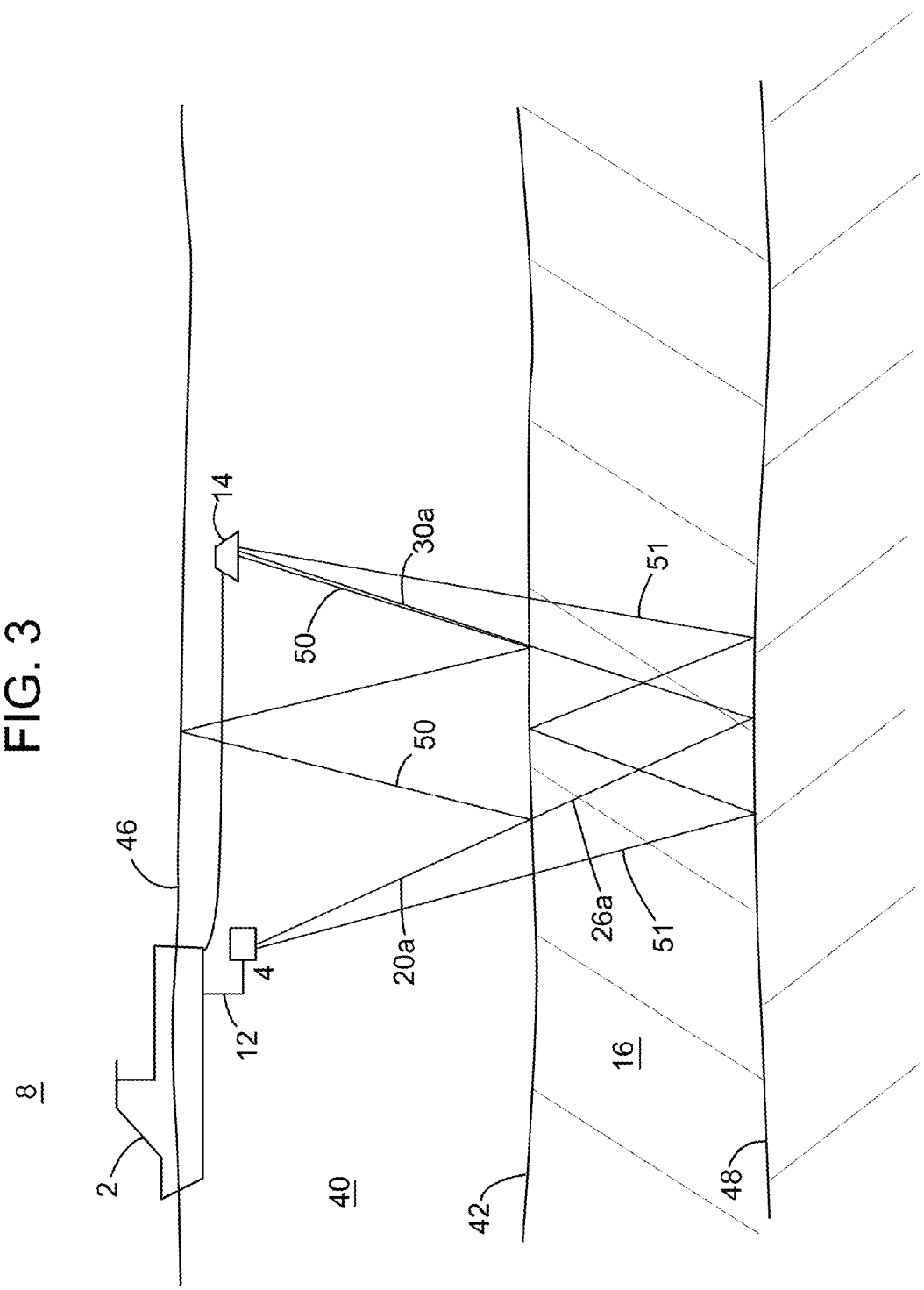

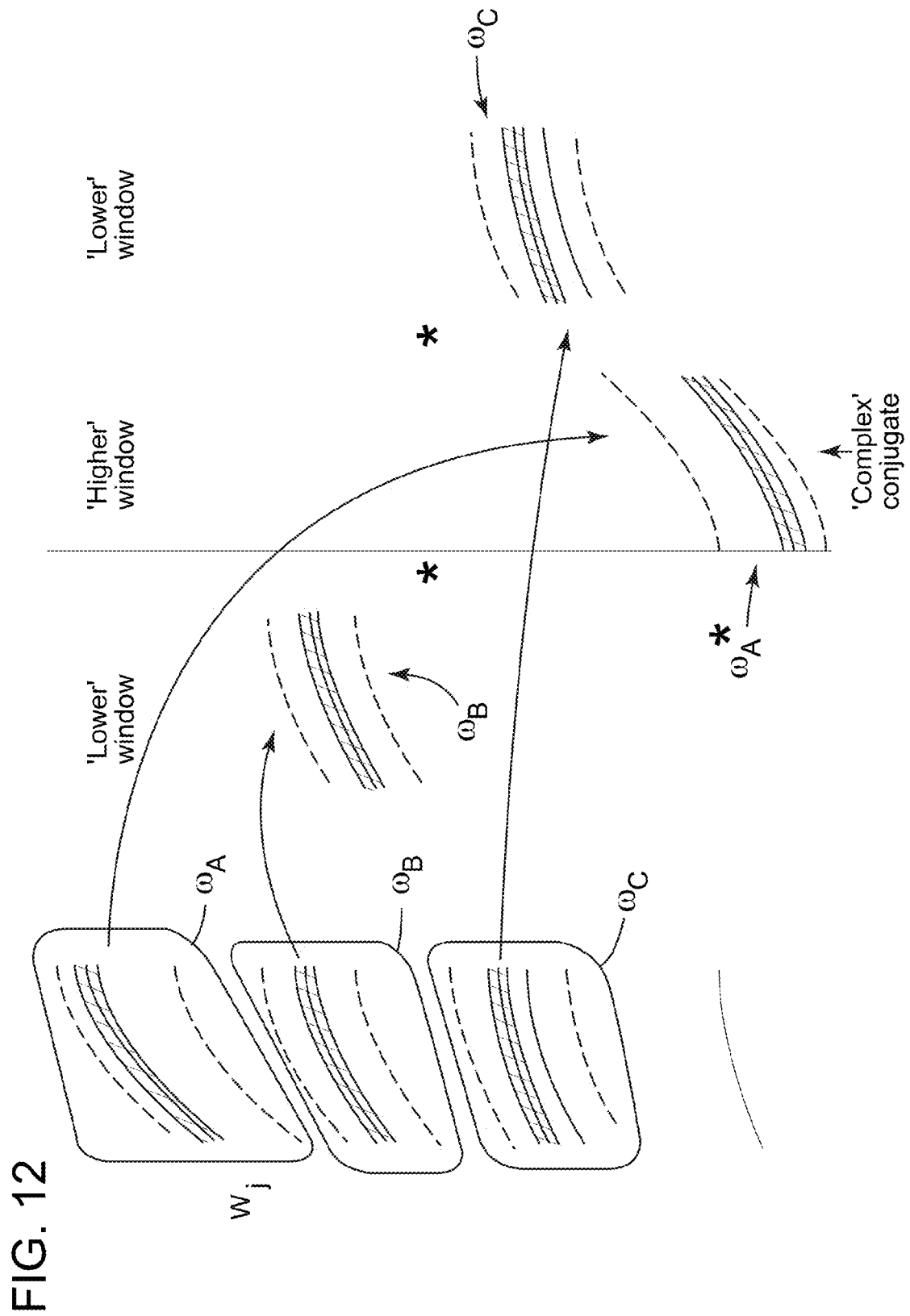

SEISMIC DATA PROCESSING INCLUDING INTERNAL MULTIPLE MODELING WITHOUT SUBSURFACE INFORMATION

DOMESTIC PRIORITY INFORMATION

The present application claims priority under 35 U.S.C. §119(e) to U.S. Provisional Patent Application Ser. No. 61/585,830, filed Jan. 12, 2012, the entire contents of which are expressly incorporated herein by reference.

TECHNICAL FIELD

The present invention relates generally to seismic exploration, and more specifically to systems and methods for substantially eliminating the influence of multiple reflections in processing acquired seismic data without a priori knowledge of subsurface information.

BACKGROUND

A widely used technique for searching for oil or gas is the seismic exploration of subsurface geophysical structures. The seismic exploration process consists of generating seismic waves (i.e., sound waves) directed toward the subsurface area, gathering data on reflections of the generated seismic waves at interfaces between layers of the subsurface, and analyzing the data to generate a profile (image) of the geophysical structure, i.e., the layers of the investigated subsurface. This type of seismic exploration can be used both on the subsurface of land areas and for exploring the subsurface of the ocean floor.

It is known by those of ordinary skill in the art of seismic exploration that an appropriate choice of frequencies to drive a sound producing device can be used to generate seismic waves whose reflections can, in turn, be used to determine the possible or probable location of hydrocarbon deposits under, e.g., the ocean floor. The sound producing device in such marine applications can be referred to as a marine vibrator, and is generally also called a "source," i.e., a source of the sound waves that are transmitted and then reflected/refracted off the ocean floor and then received by one or more, usually dozens, of receivers. Marine vibrators (herein after referred to as "vibrators," "marine vibrators," and/or "seismic vibrators") can be implemented in what are referred to as "towed arrays" of the plurality of sources and their receivers, wherein each towed array can include numerous vibrators, numerous receivers, and can include several or more groups of receivers, each on its own cables, with a corresponding source, again on its own cable. Systems and methods for their use have been produced for devices that can maintain these cables, for example, in relatively straight lines as they are being towed behind ships in the ocean. As those of ordinary skill in the art can appreciate, an entire industry has been created to explore the oceans for new deposits of hydrocarbons, and has been referred to as "reflection seismology."

For a seismic gathering process, as shown in FIG. 1, a data acquisition system 10 includes a ship 2 towing plural streamers 6 that may extend over kilometers behind ship 2. Each of the streamers 6 can include one or more birds 13 that maintains streamer 6 in a known fixed position relative to other streamers 6, and the birds 13 are capable of moving streamer 6 as desired according to bi-directional communications birds 13 can receive from ship 2. One or more source arrays 4a,b may be also towed by ship 2 or another ship for generating seismic waves. Source arrays 4a,b can be placed either in front of or behind receivers 14, or both behind and in front of receivers 14. The seismic waves generated by source arrays 4a,b propagate downward, reflect off of, and penetrate the seafloor, wherein the refracted waves eventually are reflected by one or more reflecting structures (not shown in FIG. 1) back to the surface (see FIG. 2, discussed below). The reflected seismic waves propagate upwardly and are detected by receivers 14 provided on streamers 6. This process is generally referred to as "shooting" a particular seafloor area, and the seafloor area can be referred to as a "cell".

FIG. 2 illustrates a side view of the data acquisition system 10 of FIG. 1. Ship 2, located on ocean surface 46, tows one or more streamers 6, that is comprised of cables 12, and a plurality of receivers 14. Shown in FIG. 2 are two source streamers, which include sources 4a,b attached to respective cables 12a,b. Each source 4a,b is capable of transmitting a respective sound wave, or transmitted signal 20a,b. For the sake of simplifying the drawings, but while not detracting at all from an understanding of the principles involved, only a first transmitted signal 20a will be shown (even though some or all of source 4 can be simultaneously (or not) transmitting similar transmitted signals 20). First transmitted signal 20a travels through ocean 40 and arrives at first refraction/reflection point 22a. First reflected signal 24a from first transmitted signal 20a travels upward from ocean floor 42, back to receivers 14. As those of skill in the art can appreciate, whenever a signal—optical or acoustical—travels from one medium with a first index of refraction $n_1$ and meets with a different medium, with a second index of refraction $n_2$, a portion of the transmitted signal is reflected at an angle equal to the incident angle (according to the well-known Snell's law), and a second portion of the transmitted signal can be refracted (again according to Snell's law).

Thus, as shown in FIG. 2, first transmitted signal 20a generates first reflected signal 24a, and first refracted signal 26a. First refracted signal 26a travels through sediment layer 16 (which can be generically referred to as first subsurface layer 16) beneath ocean floor 42, and can now be considered to be a "new" transmitted signal, such that when it encounters a second medium at second refraction/reflection point 28a, a second set of refracted and reflected signals 32a and 30a, are subsequently generated. Further, as shown in FIG. 2, there happens to be a significant hydrocarbon deposit 44 within a third medium, or solid earth/rock layer 18 (which can be generically referred to as second subsurface layer 18). Consequently, refracted and reflected signals are generated by the hydrocarbon deposit, and it is the purpose of data acquisition system 10 to generate data that can be used to discover such hydrocarbon deposits 44.

The signals recorded by seismic receivers 14 vary in time, having energy peaks that may correspond to reflectors between layers. In reality, since the sea floor and the air/water are highly reflective, some of the peaks correspond to multiple reflections or spurious reflections that should be eliminated before the geophysical structure can be correctly imaged. Primary waves suffer only one reflection from an interface between layers of the subsurface (e.g., first reflected signal 24a). Waves other than primary waves are known as multiples. Signal 50a shown in FIG. 2 is one such example of a multiple, but as shown in FIG. 3, there are other ways for multiples to be generated.

As illustrated in FIG. 3, seismic source 4 produces first transmitted wave 20a that splits into a primary transmitted wave 26a (referred to also as first refracted signal) penetrating inside first subsurface layer 16 (referred to also as "sediment layer" though that does not necessarily need to be the case) under ocean floor 42, and surface related multiple signal 50 that travels back towards ocean surface 46 (or fourth interface). Primary transmitted wave 26a is reflected once at second interface 48 between different layers in first subsurface layer 16 and travels back to receiver 14 as second reflected signal 30a. Surface related multiple signal 50 also reaches receiver 14, but at a different time, after being reflected (at least) two more times: a first reflection at surface 46 and a second reflection at sea floor 42. Thus, receiver 14 will receive at least two different signals from the same transmitting event: second reflected signal 30a, and surface related multiple signal 50. Surface related multiple signal 50 can be received by receiver 14 either before second reflected signal 30a, at the same time, or after, depending on how far first refracted signal 26a traveled in first subsurface layer 16, and how deep ocean 40 is at the point of transmission and reflection/refraction. Thus, receiver 14 can become "confused" as to the true nature of the subsurface environment due to surface multiple signal(s) 50. As briefly discussed above, other multiples can also be generated, some of which may also travel through the subsurface. A multiple, therefore, is any signal that is not a primary reflected signal. Further, a different type of multiple signal is also shown in FIG. 3, internal multiple signal 51, which experiences a downward reflection from an underground layer, such as shown in FIG. 3. "Multiples", as is known by those of ordinary skill in the art, can cause problems with determining the true nature of the geology of the earth below the ocean floor. Multiples (whether surface related multiples 50 or internal multiples 51) can be confused by data acquisition system 10 with first, second or third reflected signals. Multiples do not add any useful information about the geology beneath the ocean floor, and thus they are, in essence, noise, and it is desirable to eliminate them and/or substantially reduce and/or eliminate their influence in signal processing of the other reflected signals so as to correctly ascertain the presence (or the absence) of underground/underwater hydrocarbon deposits.

While surface multiples 50 cause some problems with signal processing to determine the "true" nature of the underwater subsurface geology, internal multiples 51 have been known to be especially problematic. Internal multiples 51 typically arise due to a series of subsurface impedance contrasts. They are commonly observed in seismic data acquired in various places, such as the Santos Basin of Brazil. They are often poorly discriminated from the primaries (i.e., the first, second and third reflected signals, among others), because they have similar movement, dips and frequency bandwidth, thereby making attenuation and/or elimination of internal multiples 51 one of the key issues in providing clear seismic images in interpreting areas of interest. Over time, various methods have been developed to address this difficult problem and most of them rely on the ability to identify the multiple generators. Approaches, such as Delft's feedback model (Verschuur, D. J. et al., 1996, "Removal of Inter-bed Multiples," 58th Meeting, EAGE, Expanded Abstracts, Paper B003, the entire contents of which are incorporated herein by reference), Jakubowicz' convolution-correlation method (Pica, A. et al., 2008, "Wave Equation Based Internal Multiple Modelling in 3D," 78th Meeting, SEG, Expanded Abstracts, p. 2476-2480, the entire contents of which are incorporated herein by reference), model driven methods, and predictive de-convolution (Hugonnet, P. et al., 2005, "2D Deconvolution for OBC Data and for Internal Multiple Attenuation—Part 1: Theory," 67th Meeting, EAGE, Extended Abstracts, Paper A026, the entire contents of which are incorporated herein by reference) require a priori information about the subsurface. When the information is available, perhaps via well logs or interpretation results, significant suppression of internal multiples can be observed in these methods. Nevertheless, in many situations, it is often not easy to identify the multiple generators and this makes the problem challenging.

Other methods for handling multiples have also been developed that do not require a priori subsurface reflector information. For example, a methodology has been developed using inverse scattering series (ISS) (Otnes, E. et al., 2004, in "Attenuation of Internal Multiples for Multicomponent and Towed Streamer Data," 74th Meeting, SEG, Extended Abstracts, p. 1297-1300, the entire contents of which is incorporated herein by reference), has been applied on marine and land data for internal multiple attenuation. The ISS method is a data-driven approach that can predict all internal multiples of a given order without any subsurface information. As those of skill in the art can appreciate, order of multiples refers to the number of downward bounces a wavefield experiences prior to being captured by a receiver. In comparison, Delft's feedback model or Jakubowicz' method removes all orders of internal multiples for a given interface (see, Verschuur, D. J. et al., 1999, "A Comparison of the Feedback and Inverse Scattering Internal Multiple Attenuation Methods," 61st Meeting, EAGE, Extended Abstracts, p. 1-14, the entire contents of which are incorporated herein by reference). There are significant differences between the two classes of modelling methodology. One difference is that internal multiples are catalogued differently and the other significant difference is the requirement for a priori information in the former class of modelling technologies (see, Matson, K. H. et al., 1998, "Comparing the Interface and Point Scatterer Methods for Attenuating Internal Multiples: A Study with Synthetic Data—Part II," 68th Meeting, SEG, Extended Abstracts, p. 1523-1526, the entire contents of which are incorporated herein by reference). However, it has been asserted that, for surface-related multiple attenuation, the two methods are the same in theory (see, Levin, S. A., 2008, "Delft Inverse Scattering Surface-Related Multiple Attenuation in Three Lines," 78th Meeting, SEG, Extended Abstracts, p. 2512-2515, the entire contents of which are incorporated herein by reference).

One of the important requirements in ISS that allows it to predict internal multiples without subsurface information is the requirement for a pseudo-depth monotonicity condition (see, Nita, B. G. et al., 2007, "Inverse Scattering Internal Multiple Attenuation Algorithm: An Analysis of the Pseudo-Depth and Time Monotonicity Requirements," 77th Meeting, SEG, Expanded Abstracts, p. 2461-2464, the entire contents of which are incorporated herein by reference). The pseudo-depth monotonicity condition basically means that, for a particular internal multiple event, the point scatterer that causes the downward reflection is at a higher depth (in pseudo-depth) than that of the point scatterers that cause the upward reflections, i.e., satisfying a "lower-higher-lower" relationship.

The inherent limitation in the ISS approach of pseudo-depth monotonicity limits its ability to be widely used. Accordingly, it would be desirable to provide methods, modes and systems for effectively and efficiently eliminating the influence of internal multiples when determining sub-ocean floor geology, in order to make it easier to determine the presence (or not) of sub-surface hydrocarbons.

SUMMARY

Various embodiments described herein substantially solve at least one or more of the problems and/or disadvantages discussed above, and provide at least one or more of the advantages described below.

It is therefore a general aspect of the embodiments to provide a system and method for predicting internal multiples without having to identify multiple generators that will obviate or minimize problems of the type previously described.

According to a first aspect of the embodiments, a method is provided for substantially eliminating an influence of internal multiple reflections in determining undersea geography in a geographical area of interest without a priori knowledge of subsurface information, the method comprising (a) generating a series of seismic signals by a plurality of source transmitters, (b) receiving raw data at a plurality of receivers based on the generated series of seismic signals, (c) creating a set of M windows that corresponds physically to a space below the plurality of receivers and includes a geographical area of interest, (d) assigning received raw data to respective ones of the set of windows based on received time of the raw data, to generate M window data frames, wherein a first uppermost window data frame incorporates raw data that corresponds to an uppermost wavefield closest to the plurality of receivers, and an $M^{th}$ window data frame incorporates raw data that corresponds to a lowermost wavefield farthest from the plurality of receivers, (e) iteratively generating an internal multiple model, using a sliding set of three window data frames, wherein for each iteration, wherein the internal multiple model includes a first product of a convolution of data from a first window data frame and a second window date frame, and a correlation of data from a third window data frame with the first product, (f) summing all of the iteratively generated internal multiple models to create a complete internal multiple model, and continuing the summing until all of the window data frames have been used, and (g) subtracting the complete internal multiple model from the raw data to substantially eliminate the influence of internal multiples in determining the geography of the geographical area of interest. According to the first aspect, the method further comprises processing the raw data to suppress surface related multiples prior to generating the internal multiple model. Still further according to the first aspect, the step of processing to suppress surface related multiples comprises using a method of surface related multiple elimination to suppress the surface multiples.

According to the first aspect, the step of determining the set of M windows is based on travel time of the series of seismic signals from the plurality of sources to the plurality of receivers, and further wherein each of the M window time frames is substantially similar in duration, and the step of generating an internal multiple model using window data from a first set of three window data frames includes performing the following equation:

$$M = -\sum_{w_j=1}^{w_n} \left( \sum_{w_k > w_j}^{w_n} P_{w_k} P_{w_j}^* \sum_{w_l > w_j}^{w_n} P_{w_l} \right),$$

wherein
in each iteratively defined set of three window data frames, a higher wavefield generated by data in the uppermost window data frame is defined as $Pw_j$, a first lower wavefield generated by data in the second window data frame is defined as $P_{wk}$, and a second lower wavefield generated by data in the third window data frame is defined as $P_{wl}$, and further wherein, $P_{wj}$ is a source side wavefield that represents a downward reflection of an internal multiple reflected from the first window, $P_{wk}$ is a source side wavefield that represents an upward reflection of an internal multiple reflected from the second window, and $P_{wl}$ is an receiver side wavefield that represents a upward reflection of an internal multiple reflected from the third window.

According to the first aspect, each of the M windows has as length and depth component, and wherein the length component is less than or equal to a distance between a first source and a last source, and further wherein the depth component correlates to a first number of samples that correlates to a first depth in distance, and further wherein adjacent windows overlap by a second number of samples less than the first number of samples, which corresponds to an overlap in depth defined as a second depth, and still further wherein the second depth is less than the first depth, and still further wherein for an increasing value of M the depth of the window increases.

According to the first aspect, each of the plurality of sets of windows satisfies a pseudo-depth monotonicity condition of lower-higher-lower windows, wherein Pwj is a higher window, and $P_{wk}$ and $P_{wl}$ are both lower windows.

According to a second aspect of the embodiments, a method for determining internal multiples in marine seismic data without requiring a priori knowledge about sub-surfaces is provided, the method comprising (a) obtaining seismic data in and about a geographical area of interest (GAI), (b) suppressing surface related multiples in regard to the GAI, (c) separating the obtained seismic data into a plurality of windows based on a travel time of wavefields generated by one or more wavefield sources, and receive by one or more wavefield receivers, (d) performing a convolution between the separated window data that are responsible for upward reflections of internal multiples to generate convolution data, (e) performing a correlation between the separated window data that are responsible for downward reflections of the corresponding internal multiples, (f) determining the product of the correlated data and the convoluted data to create an internal multiple model, and (g) repeating steps (d)-(f) for a plurality of sets of the plurality of windows thereby determining a substantially complete internal multiple model for the GAI.

According to the second aspect, the step of performing the convolution and correlation comprises defining a first set of three window data frames, performing the convolution and correlation on data contained in the set of three windows to determine an internal multiple model, iteratively defining new sets of three windows with all of the remaining window data frames, and performing the convolution and correlation on the data from each of the new iteratively defined set of three window data frames, to determine a new internal multiple model, which is iteratively added to a previous multiple model to determine a substantially complete internal multiple model, and wherein for each of the iteratively defined sets of three windows, a pseudo-monotonicity requirement is satisfied when a lower-higher-lower relationship occurs within in each of the iteratively defined sets of three window data frames.

According to the second aspect, the method further comprises subtracting the substantially complete internal multiple model from the obtained seismic data to substantially eliminate an influence of internal multiples in determining the geography of a GAI, and still further comprises eliminating surface multiples from the seismic data prior to determining an internal multiple model.

According to the second aspect, the step of performing the convolution and correlation on the iteratively defined sets of window data frames includes performing the following equation:

$$M = -\sum_{w_j=1}^{w_n} \left( \sum_{w_k > w_j}^{w_n} P_{w_k} P_{w_j}^* \sum_{w_l > w_j}^{w_n} P_{w_l} \right),$$

wherein
in each of the iteratively defined sets of three window data frames, a highest wavefield generated by data in an uppermost window data frame is defined as $Pw_j$, a first lower wavefield generated by data in a second window data frame is defined as $P_{wk}$, and a second lower wavefield generated by data in a third window data frame is defined as $P_{wl}$, and further wherein, $P_{wj}$ is a source side wavefield that represents an downward reflection of an internal multiple reflected from the first window, $P_{wk}$ is a source side wavefield that represents an upward reflection of an internal multiple reflected from the second window, and $P_{wl}$ is an receiver side wavefield that represents a upward reflection of an internal multiple reflected from the third window.

According to a third aspect of the embodiments, a system for substantially eliminating an influence of internal multiple reflections in determining undersea geography in a geographical area of interest without a priori knowledge of sub-surface information is provided, the system comprising (a) a plurality of source transmitters configured to generate a series of seismic signals, (b) a plurality of receivers configured to receive raw data based on the generated series of seismic signals, and (c) a processor configured to create a set of M windows that corresponds physically to a space below the plurality of receivers and includes a geographical area of interest, assign received raw data to respective ones of the set of windows based on received time of the raw data, to generate M window data frames, wherein a first uppermost window data frame incorporates raw data that corresponds to an uppermost wavefield closest to the plurality of receivers, and an $M^{th}$ window data frame incorporates raw data that corresponds to a lowermost wavefield farthest from the plurality of receivers, iteratively generate an internal multiple model, using a sliding set of three window data frames, wherein for each iteration, wherein the internal multiple model includes a first product of a convolution of data from a first window data frame and a second window date frame, and a correlation of data from a third window data frame with the first product, sum all of the iteratively generated internal multiple models to create a complete internal multiple model, and continuing the summing until all of the window data frames have been used, and subtract the complete internal multiple model from the raw data to substantially eliminate the influence of internal multiples in determining the geography of the geographical area of interest.

According to the third aspect, the processor is further configured to process the raw data to suppress surface related multiples prior to generating the internal multiple model, and further wherein the processor is further configured to suppress surface related multiples using a method of surface related multiple elimination.

According to the third aspect the processor is further configured to determine the set of M windows based on travel time of the series of seismic signals from the plurality of sources to the plurality of receivers, and further wherein each of the M window time frames is substantially similar in duration.

According to the third aspect, the processor is further configured to generate an internal multiple model using window data from a first set of three window data frames that includes performing the following equation:

$$M = -\sum_{w_j=1}^{w_n} \left( \sum_{w_k > w_j}^{w_n} P_{w_k} P_{w_j}^* \sum_{w_l > w_j}^{w_n} P_{w_l} \right),$$

wherein
in each iteratively defined set of three window data frames, a higher wavefield generated by data in the uppermost window data frame is defined as $Pw_j$, a first lower wavefield generated by data in the second window data frame is defined as $P_{wk}$, and a second lower wavefield generated by data in the third window data frame is defined as $P_{wl}$, and further wherein, $P_{wj}$ is a source side wavefield that represents an downward reflection of an internal multiple reflected from the first window, $P_{wk}$ is a source side wavefield that represents an upward reflection of an internal multiple reflected from the second window, and $P_{wl}$ is an receiver side wavefield that represents a upward reflection of an internal multiple reflected from the third window.

According to the third aspect, each of the M windows has as length and depth component, and wherein the length component is less than or equal to a distance between a first source and a last source, and further wherein the depth component correlates to a first number of samples that correlates to a first depth in distance, and further wherein adjacent windows overlap by a second number of samples less than the first number of samples, which corresponds to an overlap in depth defined as a second depth, and still further wherein the second depth is less than the first depth, and still further wherein for an increasing value of M the depth of the window increases.

According to the third aspect, each of the plurality of sets of windows satisfies a pseudo-depth monotonicity condition of lower-higher-lower windows, wherein Pwj is a higher window, and $P_{wk}$ and $P_{wl}$ are both lower windows.

According to a fourth aspect of the embodiments, a system for determining internal multiples in marine seismic data without requiring a priori knowledge about sub-surfaces is provided, the system comprising a processor configured to obtain seismic data in and about a geographical area of interest (GAI), wherein the processor is further configured to (a) suppress surface related multiples in regard to the GAI, (b) separate the obtained seismic data into a plurality of windows based on a travel time of wavefields generated by one or more wavefield sources, and receive by one or more wavefield receivers, (c) perform a convolution between the separated window data that are responsible for upward reflections of internal multiples to generate convolution data, (d) perform a correlation between the separated window data that are responsible for downward reflections of the corresponding internal multiples, (e) determine the product of the correlated data and the convoluted data to create an internal multiple model, and repeat parts (c)-(e) for a plurality of sets of the plurality of windows thereby determining a substantially complete internal multiple model for the GAI.

According to the fourth aspect, the processor is further configured to perform the convolution and correlation by defining a first set of three window data frames, perform the convolution and correlation on data contained in the set of three windows to determine an internal multiple model, iteratively define new sets of three windows with all of the remaining window data frames, and perform the convolution and correlation on the data from each of the new iteratively defined set of three window data frames, to determine a new internal multiple model, which is iteratively added to a previous multiple model to determine a substantially complete internal multiple model, and wherein for each of the iteratively defined sets of three windows, a pseudo-monotonicity requirement is satisfied when a lower-higher-lower relationship occurs within in each of the iteratively defined sets of three window data frames.

According to the fourth aspect, the processor is further configured to subtract the substantially complete internal multiple model from the obtained seismic data to substantially eliminate an influence of internal multiples in determining the geography of a GAI, and the processor is further configured to eliminate surface multiples from the seismic data prior to determining an internal multiple model.

According to the fourth aspect, the processor is further configured to perform the convolution and correlation on the iteratively defined sets of window data frames by performing the following equation:

$$M = -\sum_{w_j=1}^{w_n}\left(\sum_{w_k>w_j}^{w_n} P_{w_k} P_{w_j}^* \sum_{w_l>w_j}^{w_n} P_{w_l}\right),$$

wherein
in each of the iteratively defined sets of three window data frames, a highest wavefield generated by data in an uppermost window data frame is defined as $Pw_j$, a first lower wavefield generated by data in a second window data frame is defined as $P_{wk}$, and a second lower wavefield generated by data in a third window data frame is defined as $P_{wl}$, and further wherein, $P_{wj}$ is a source side wavefield that represents an downward reflection of an internal multiple reflected from the first window, $P_{wk}$ is a source side wavefield that represents an upward reflection of an internal multiple reflected from the second window, and $P_{wl}$ is an receiver side wavefield that represents a upward reflection of an internal multiple reflected from the third window.

BRIEF DESCRIPTION OF THE DRAWINGS

The above features of the present general inventive concept will become apparent and more readily appreciated from the following description of the embodiments with reference to the following figures, wherein like reference numerals refer to like parts throughout the various figures unless otherwise specified, and wherein:

FIGS. 2 and 3 illustrate side views of the data acquisition system of FIG. 1;

FIG. 12 illustrates determination of windows for use in method 100 described in regard to FIG. 10 according to an exemplary embodiment.

DETAILED DESCRIPTION

Figure 1:
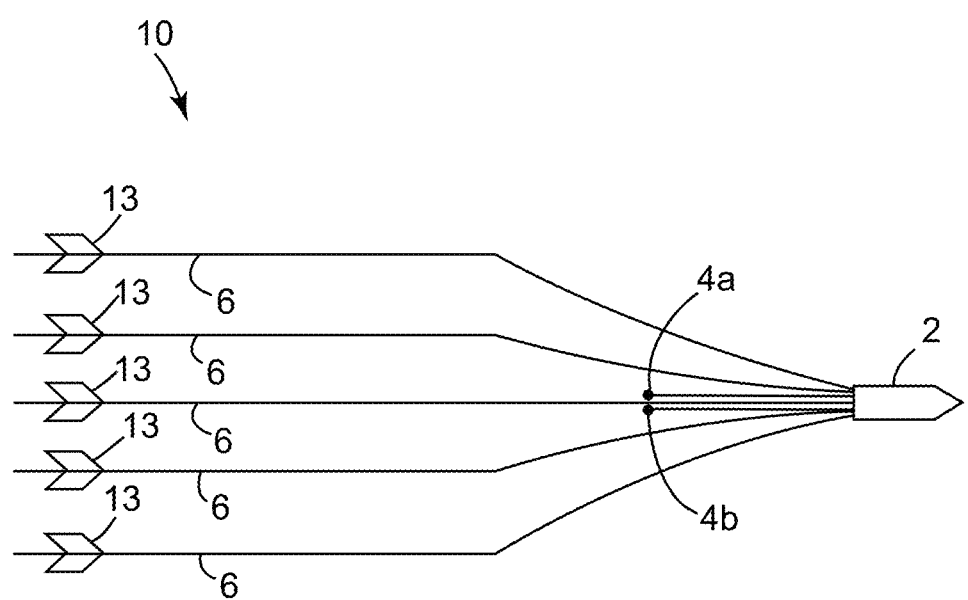
FIG. 1 illustrates a data acquisition system for use in a seismic gathering process.
Figure 2:
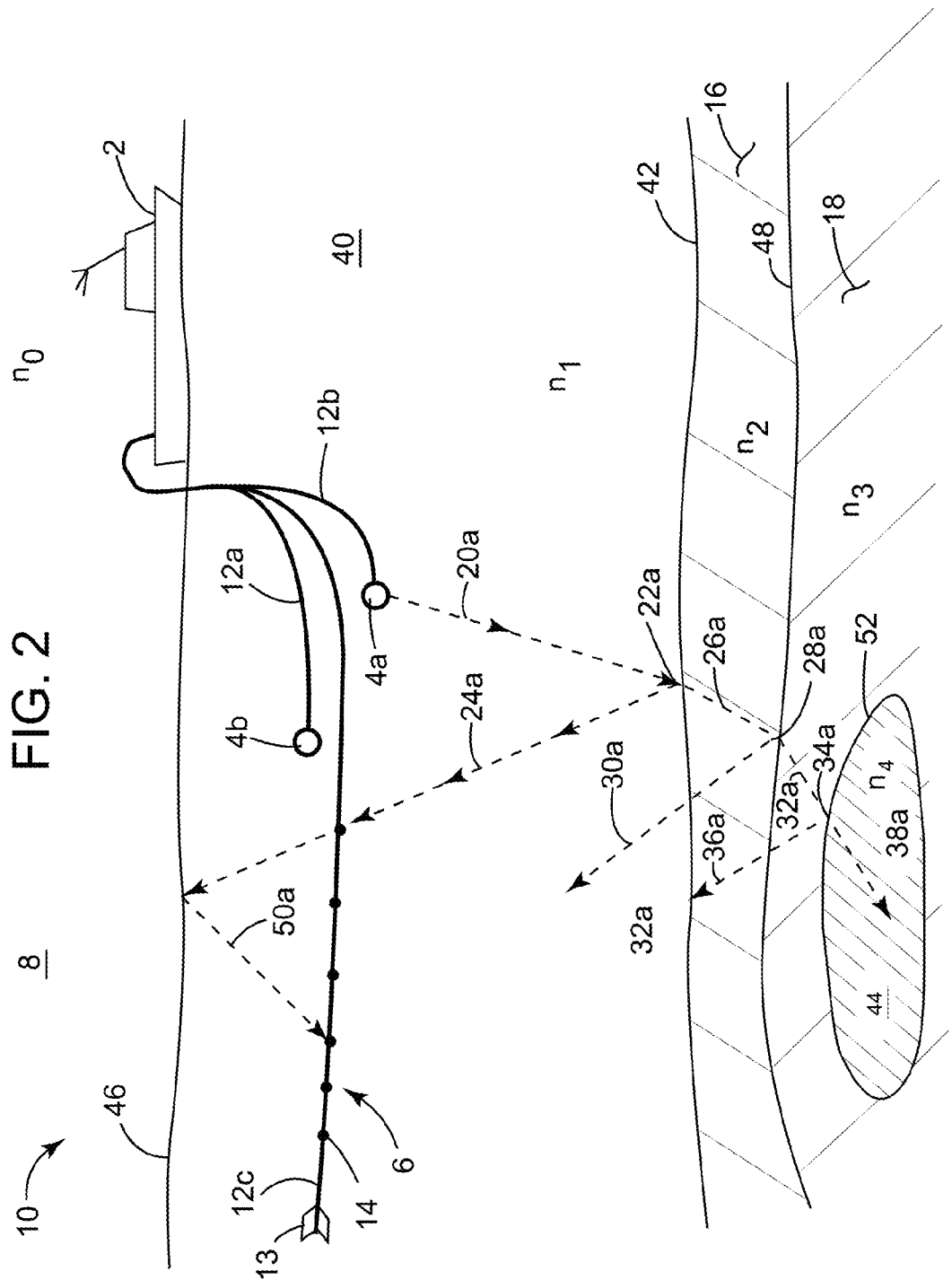

The inventive concept is described more fully hereinafter with reference to the accompanying drawings, in which embodiments of the inventive concept are shown. In the drawings, the size and relative sizes of layers and regions may be exaggerated for clarity. Like numbers refer to like elements throughout. This inventive concept may, however, be embodied in many different forms and should not be construed as limited to the embodiments set forth herein. Rather, these embodiments are provided so that this disclosure will be thorough and complete, and will fully convey the scope of the inventive concept to those skilled in the art. The scope of the invention is therefore defined by the appended claims. The following embodiments are discussed, for simplicity, with regard to the terminology and structure of an underwater and undersea-floor seismic characteristic determination system using a system of seismic transmitters and receivers. However, the embodiments to be discussed next are not limited to these systems but may be applied to other seismic characteristic determination systems that utilize the same or similar types of seismic determination systems.

Reference throughout the specification to "one embodiment" or "an embodiment" means that a particular feature, structure, or characteristic described in connection with an embodiment is included in at least one embodiment. Thus, the appearance of the phrases "in one embodiment" on "in an embodiment" in various places throughout the specification is not necessarily referring to the same embodiment. Further, the particular feature, structures, or characteristics may be combined in any suitable manner in one or more embodiments.

Used throughout the specification are several acronyms, the meaning of which are provided as follows: surface related multiple elimination (SRME); inverse scattering series (ISS);

two-dimensional (2D); read-only memory (ROM), random-access memory (RAM), compact disk (CD) ROMs; universal serial bus (USB); compact disk (CD); digital versatile disk (DVD); read/write (R/W); hard disk drive (HDD); read-only memory (ROM); electrically erasable (EE); programmable ROM (EEPROM); ultra-violet erasable PROM (UVPROM); random access memory (RAM); liquid crystal displays (LCDs); cathode ray tubes (CRTs); input/output (I/O); global positioning system (GPS); global area network (GAN); field programmable gate array structures (FPGAs); application specific integrated circuitry (ASICs); and basic input/output system (BIOS).

Figures 4A, 4B:
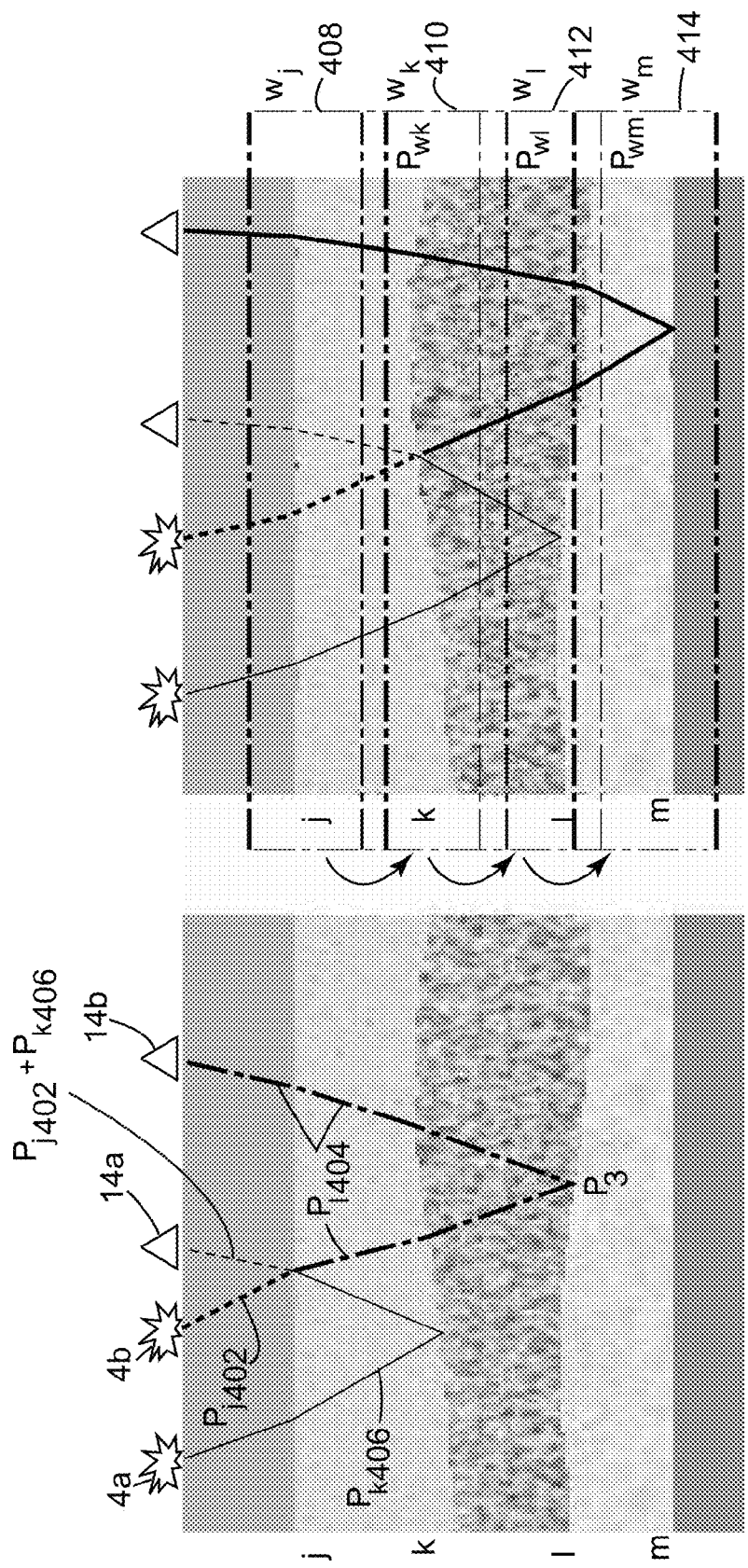
FIG. 4A illustrates a data plot of a known process for predicting the existence of internal multiples reflecting downward from a first horizon.
FIG. 4B illustrates a data plot of method for predicting the existence of all internal multiples without identifying any multiple-generating horizons according to an exemplary embodiment.

As described in the 1998 article attributed to Jakubowicz (hereinafter "Jakubowicz"), an internal multiple event can be constructed by combining three wavefield components, as illustrated in FIG. 4A, which involves a two-trace convolution followed by a single-trace correlation or some combination thereof:

$$M(j) = -\sum_{k>j}^{n} P_k P_j^* \sum_{l>j}^{n} P_l, \qquad (1)$$

where $P_j$ 402 is the primary wavefield from the surface to the horizon j ($P_j$ 402 is transmitted by source 4b, reflects off horizon j, and arrives at receiver 14a; as those of skill in the can perceive, "horizon" is another term for interface or boundary, between material with different indices of refraction n), $P_k$ 406 represents the source-side wavefield reflecting off horizon k and arrives at receiver 14a (therefore, receiver 14a receives both $P_j$ 402 and $P_k$ 406 as indicated in FIG. 4A); and $P_l$ 404 is the wavefield that is generated by $P_j$ 402 refracted through horizon j, and then reflecting up and from horizon 1 (i.e., $P_l$ 404 is the refracted signal transmitted from source 4a, and reflects off horizon 1 back to receiver 14b). In Equation (1) $P_j^*$ is the complex conjugate of $P_j$. For the dual purposes of simplicity and brevity, the source signature term is neglected in Equation (1). The summation signs in the equation are to ensure that, for an n-layer medium, all the possible internal multiples generated from the horizon j as a top reflector are included.

In using ISS for internal multiple attenuation, the 'lower-higher-lower' relationship implies that the 'higher' point scatterer can be at any pseudo-depth as long as it is above the 'lower' point scatter. For example, in FIG. 4A, horizon j is higher than horizon k, which is higher than horizon 1, and so on. According to a preferred exemplary embodiment, an extra summation can be added in a modified version of Equation (1) to include all the possible top multiple-generating horizons:

$$M = -\sum_{w_j=1}^{w_n} \left( \sum_{w_k>w_j}^{w_n} P_{w_k} P_{w_j}^* \sum_{w_l>w_j}^{w_n} P_{w_l} \right), \qquad (2)$$

such that the multiple model M is no longer horizon-specific. Prior to discussing Equation 2, however, the nomenclature will be addressed, in order to assist in understanding the exemplary embodiments described herein. Initially, according to an exemplary embodiment, the received seismic data is divided into M time windows, which is discussed in greater detail below. As shown in FIG. 4A, $P_k$ is a wavefield reflected from horizon k, which is a real, fixed, immovable (practically) physical object (e.g., it could be a thermal layer in the ocean, an ocean-floor boundary, or a boundary between sand and rock, among many other types) $P_{wk}$, however, is defined according to an exemplary embodiment as the source-side wavefields reflected from the horizons within a time window Wk; thus, it is a mathematical construct based on real, physical data, received from multiple signals, but which is determined during processing of the received data. According to an exemplary embodiment, wavefield $P_{wk}$, is obtained by processing the data that is stored in window $W_k$. According to an exemplary embodiment, wavefield $P_{wj}$, is obtained by processing the data that is stored in window $W_j$. And, according to an exemplary embodiment, wavefield $P_{wl}$, is obtained by processing the data that is stored in window $W_l$. In Equation (2), the wavefields do not correspond to a single event but to a group of events within a predetermined window. For instance, $P_{wj}$ represents the primary wavefield reflected upward from all the horizons within window $W_j$ (the arbitrarily defined $W_j$ horizon depicted in FIG. 4B, as opposed to the j horizon as depicted in FIG. 4A). $P_{wk}$ stands for the source-side wavefields reflecting from window $W_k$ 410, which, in this first case, can be defined as a source-side wavefield that represents an upward reflection of an internal multiple reflected from window Wj. $P_{wl}$ is a receiver side wavefield that represents a downward reflection of an internal multiple reflected from window wl.

As shown in FIG. 12, each seismic trace is segmented into M portions horizontally. Depending on whether it is responsible for upward or downward reflection of the internal multiple, an appropriate window will be selected to ensure that the 'lower-higher-lower' relationship is fulfilled. This is schematically illustrated in FIG. 12 using a one dimensional shot gather. After the top window, $W_A$, has been determined (because of the complex conjugate operation in equation (2), the traces appear to be flipped vertically; thus in FIG. 12, the higher window is $W_A$, flipped, showing the complex conjugate operation), two lower windows ($W_B$ and $W_C$) are then chosen to fulfill Equation (2). As those of skill can now appreciate, FIG. 12 simply represents one of the many possible combinations of the windows. For a specific top window, many 'lower' windows can be used as long as they satisfy the 'lower-higher-lower' relationship. The process, as further described below, is then repeated with other top windows. Therefore, to realize Equation (2), a top-down sliding-window approach is utilized as depicted in FIG. 4B. That is, window $W_j$ 408 is located at the top-most position, and then is slid down to a lower location several times, forming, in succession, windows $W_k$ 410, $W_l$ 412, $W_m$ 414, and so on, as determined by Equation (2), taking into regard the summation-within-summations that are included in Equation (2). FIG. 4B illustrates, according to an exemplary embodiment, that after window $W_j$ 408 has been treated as to where the top reflectors for the internal multiples may be embedded, window $W_k$ 304 can now be considered as another depth range within which the top reflectors can be found, and so on for each window, $W_l$ 412, then $W_m$ 414, and so on. By repeating the downward sliding of the windows, all of the internal multiples can be predicted without the need for identifying the multiple-generating horizons according to an exemplary embodiment.

As those of skill in the art can appreciate, there are several considerations to take into account when implementing Equation (2). First, the 'lower-higher-lower' constraint is met by comparing the travel time of common shot and receiver gathers performed in view of normal move-outs. According to a further exemplary embodiment, incorporating the lower-higher-lower constraint makes the processing computationally efficient and it is performed on the pre-migrated data.

Normal move-out correction refers to a function of time and offset that can be used in seismic processing to compensate for the effects of normal move-out, or the delay in reflection arrival times when geophones and shot-points are offset from each other. Offset is defined, in surface seismic acquisition, as the horizontal distance from source to receiver. It is well known that offsets between seismic sources and their corresponding receivers creates a delay, or move-out, in the arrival time of a reflection that can be corrected before stacking and can be used to determine velocity.

However, using the normal move-out correction to meet the 'lower-higher-lower' constraint is not as accurate as doing it in pseudo-depth (see, for example, Nita, B. G. et al, 2007, "Inverse Scattering Internal Multiple Attenuation Algorithm: An Analysis of the Pseudo-Depth and Time Monotonicity Requirements," 77th Meeting, SEG, Expanded Abstracts, p. 2461-2464, the entire contents of which are incorporated herein by reference) and velocity is required in the process. Nevertheless, as understood by those of ordinary skill in the art, velocity information for near-offset extrapolation is needed for SRME, so this does not add any extra requirement on subsurface information. SRME, as can be appreciated by those of ordinary skill in the art, uses the recorded seismic data to predict and iteratively subtract the multiple series. The key advantage of SRME is that it needs no subsurface information whatsoever; the multiples are completely or substantially completely predicted from the data. Moreover, for relatively uncomplicated subsurface structures, the criterion using the travel time can be valid.

The second consideration according to an exemplary embodiment is that the separation between multiple generators (i.e., sources 4) needs to be larger than the window length. There is no such corresponding constraint in ISS. For internal multiple generators, such as coal seams that usually have closely packed strata, very short windows may be needed. In the discussion that follows, performance of a system and method according to an exemplary embodiment is analyzed when these two considerations are taken into account and the results are compared to the known ISS method. According to a further exemplary embodiment, the window size is based on the length of the source wavelets, and still further the number of windows can be determined by dividing the length of the seismic traces by the window size. While the approach of Jakubowicz does not require the two constraints discussed above, Jakubowicz is hampered by the need to identify multiple-generating horizons, i.e. a priori knowledge. As those of ordinary skill in the art can appreciate, the necessity for such apriori knowledge means the approach of Jakubowicz is more costly and less efficient than the exemplary embodiments described herein.

Synthetic and Field Data Examples

Figure 5A:
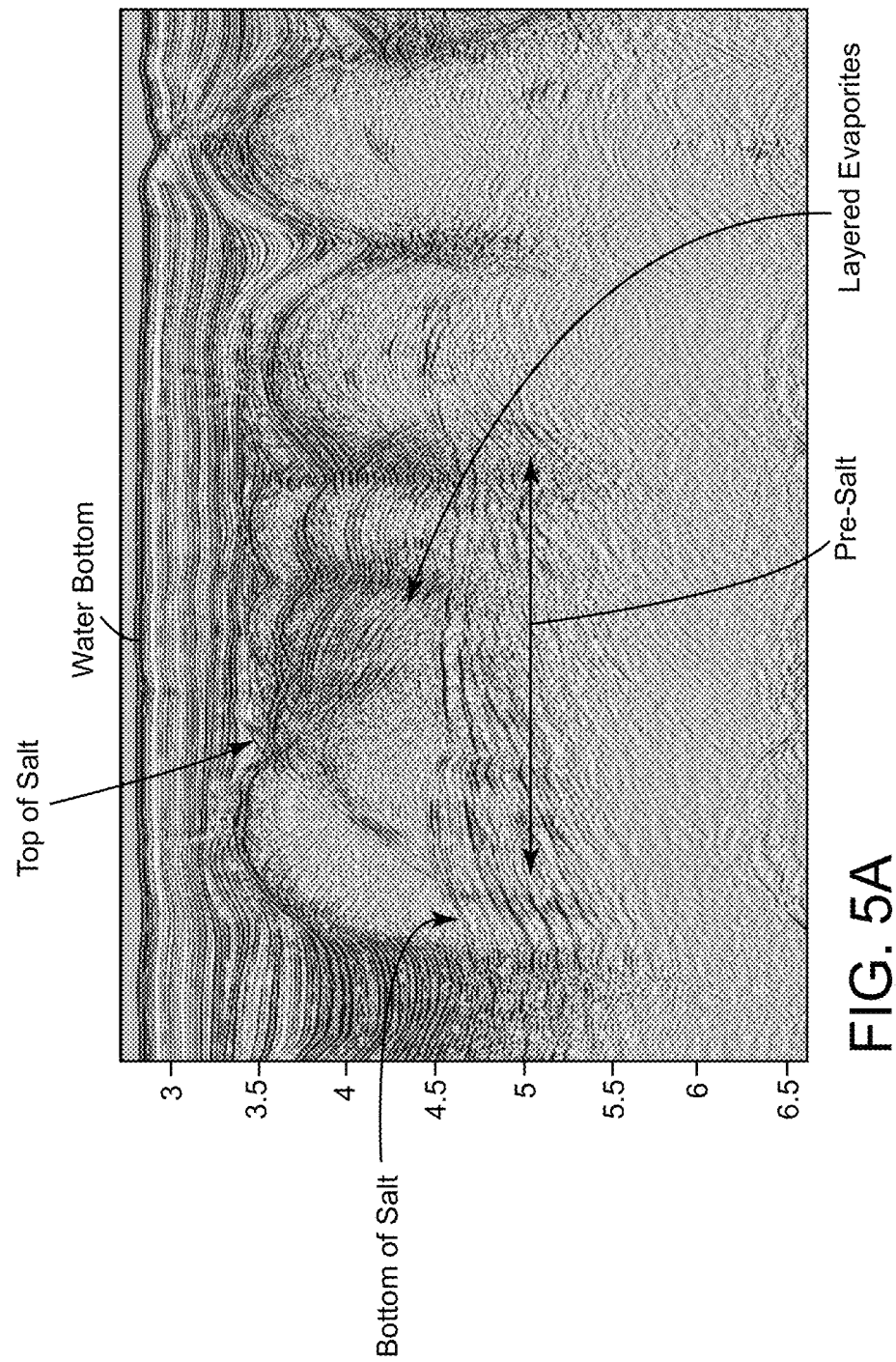
FIGS. 5A and 5B illustrate actual field data, and synthetic data generated from the actual data, respectively, acquired from the Tupi oil discovery near Santos Basin, offshore Brazil, where significant internal multiples are evident.
Figure 5B:

In order to illustrate the benefits of the exemplary embodiments of the system and method discussed herein, both the ISS based method and the method according to exemplary embodiments were applied on two-dimensional (2D) synthetic data, as well as original field data from which the synthetic data was generated. FIGS. 5A and 5B illustrate actual field data, and synthetic data generated from the actual data, respectively, acquired from the Tupi oil discovery near Santos Basin, offshore Brazil, where significant internal multiples are evident. The Tupi oil field is a large oil field located in the Santos Basin, about 250 km (160 mi) off the coast of Rio de Janeiro, Brazil. FIG. 5A shows the field data from a line close to the Tupi discovery. A series of impedance contrasts above pre-salt can be observed such as the water bottom, top of salt, and the layered salt structures, or layered evaporates (among other reasons, the Tupi oil fields are significant in that the discovered oil is located pre-salt, or below the salt level). All these reflectors can be generators of internal multiples. The synthetic data, displayed in FIG. 5B, was generated by acoustic modeling using the corresponding velocity from the field data. The density model was iteratively updated until the events in the synthetic data resemble those in the field data (note the closeness of the two figures, FIGS. 5A and 5B). The internal multiples, however, were amplified in the synthetic data so that they can be easily identified. The synthetic data in this case is used to illustrate and examine the effectiveness of the two methods.

Figure 6A:
FIG. 6A illustrates a first model of all internal multiples of the Tupi oil fields predicted using the sliding-window method according to an exemplary embodiment without any subsurface information (i.e., with no a priori subsurface information)
Figure 6B:
FIG. 6B illustrates a second model of all internal multiples of the Tupi oil fields predicted using an inverse scattering series method.
Figure 7A:
FIG. 7A illustrates the data of FIG. 6A to which adaptive subtraction has been applied to suppress internal multiples according to an exemplary embodiment.
Figure 7B:
FIG. 7B illustrates the data of FIG. 6B (generated using the inverse scattering series method) to which adaptive subtraction has been applied to suppress internal multiples.

Using a window length of 25 samples with an overlapping length of 4 samples, a model of all internal multiples, as depicted in FIG. 6A, was predicted using the sliding-window method according to exemplary embodiments without any subsurface information (i.e., with no a priori subsurface information). By way of a non-limiting example only, an exemplary sample length can be 25 samples with a processing sampling rate of 4 milliseconds, which means that the window length in time, or temporally, is segmented into about 100 milliseconds portions. However, the "length" in this sense actually corresponds to the depth of each window, as discussed in greater detail below. Previously, the same data set was tested before but with the need of identifying the multiple-generating horizons (see, Griffiths, M. et al., 2011, "Applications of Inter-bed Multiple Attenuation," The Leading Edge, 30, no. 8, p. 906-912, the entire contents of which are incorporated herein by reference). FIG. 6B illustrates a second model of all internal multiples of the Tupi oil fields predicted using the ISS method. It can be observed in the two predictions that the multiples around pre-salt, which are mainly related to the water bottom, and those internal multiples generated from the top of salt and layered evaporates are well modeled by both methods. Even though the structure of one of the top multiple-generating horizons, top of salt, is rather complicated, the system and method according to exemplary embodiments is still able to fulfill the 'lower-higher-lower' relationship because the top multiple-generating horizons are well separated in this case. FIG. 7A illustrates the data of FIG. 6A to which adaptive subtraction has been applied to suppress internal multiples according to an exemplary embodiment. FIG. 7B illustrates the data of FIG. 6B (generated using the inverse scattering series method) to which adaptive subtraction has been applied to suppress internal multiples. According to an exemplary embodiment, adaptive subtraction involves matching the amplitude spectrum of the internal multiple model to that of the input before performing the subtraction. The matching that occurs means that compensation occurs between the amplitude and frequency content between modeled information and actual information. Following matching, subtraction occurs. Therefore, FIG. 7A results from a matching of amplitude and frequency between the data shown in FIGS. 5A and 6A, and then the data of FIG. 6A is subtracted from that of 5A to provide the results shown in FIG. 7A. A similar process occurred between FIGS. 5B, 6B, and the resultant 7B. It can be seen that those internal multiples below bottom of salt that are amplified by the focusing effect that traps multiple energy in the mini-basins (see, Pica, A. et al., 2008, "Wave Equation Based Internal Multiple Modeling in 3D," 78th Meeting, SEG, Expanded Abstracts, p. 2476-2480, the entire contents of which are incorporated herein by reference) are particularly well attenuated in both results.

Figure 8A:
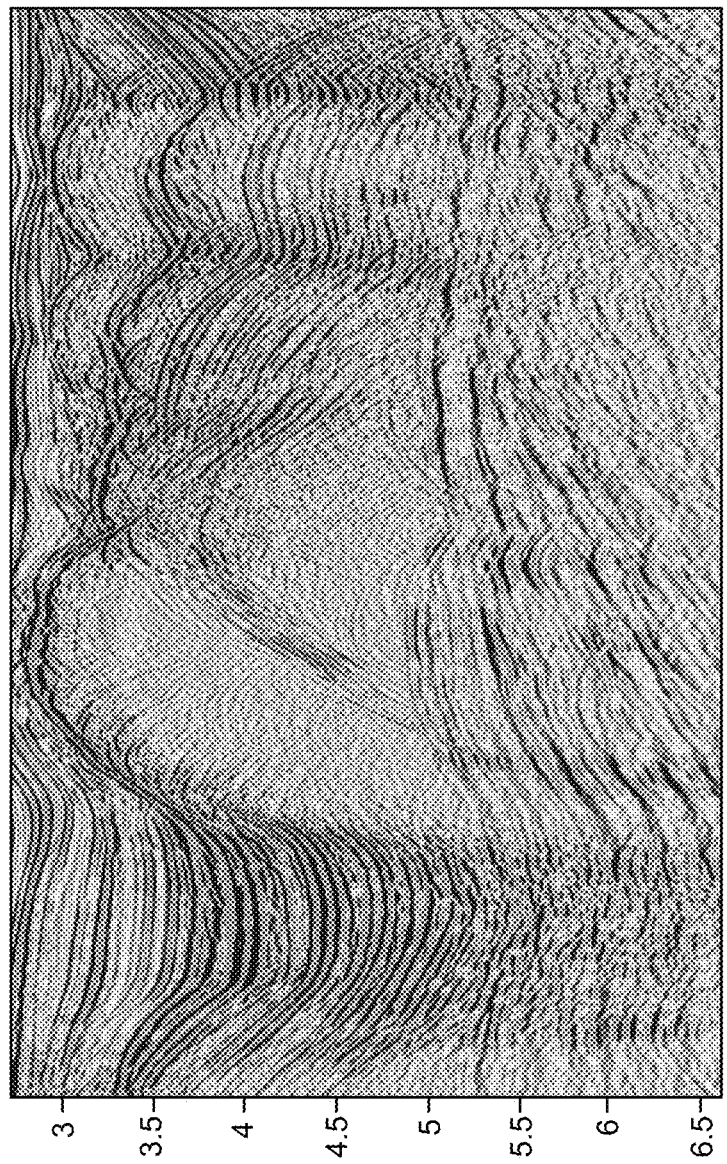
FIG. 8A illustrates a magnified section of FIG. 4A.
Figure 8B:
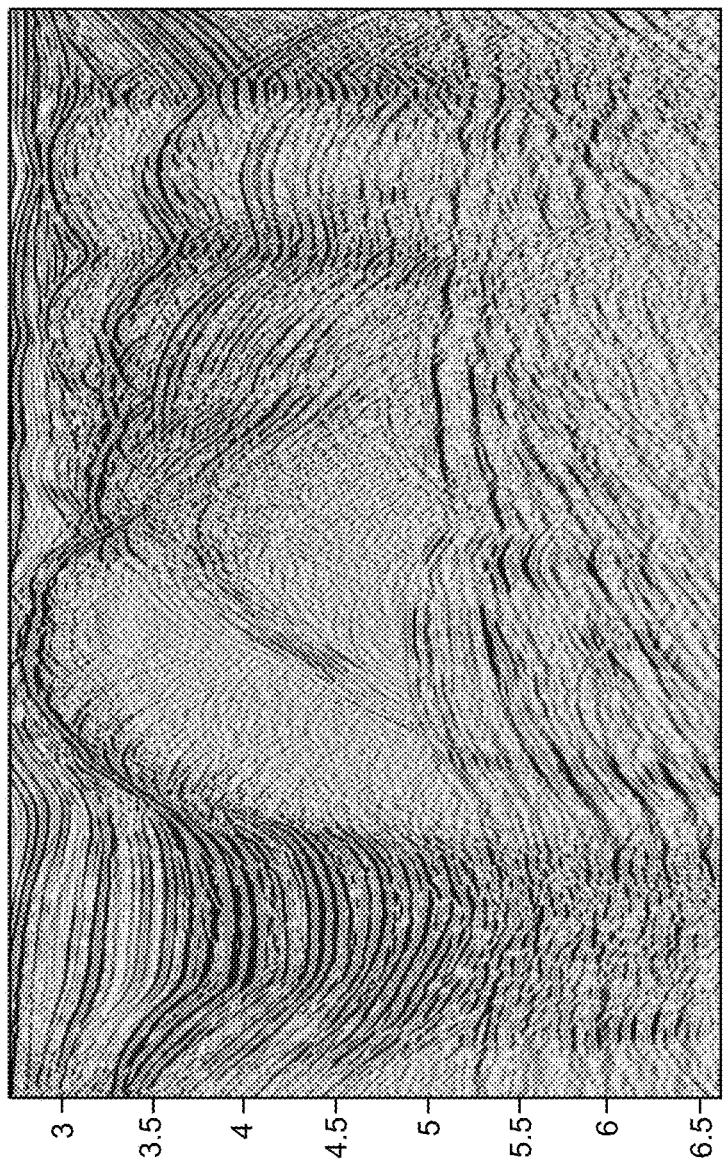
FIG. 8B illustrates the magnified section of FIG. 4A as in FIG. 8A following implementation of the method according to an exemplary embodiment.
Figure 8C:
FIG. 8C illustrates the difference between FIGS. 8A and 8B (i.e., the data from FIG. 8B being subtracted from the data from FIG. 8A)

FIG. 8A illustrates a magnified section of FIG. 4A, FIG. 8B illustrates the same data following implementation of the method according to an exemplary embodiment, and FIG. 8C illustrates the difference between FIGS. 8A and 8B (i.e., the data from FIG. 8B being subtracted from the data from FIG. 8A). Further, FIG. 9A illustrates the same data from FIG. 8A following processing using the inverse scattering series method, and FIG. 9B illustrates the difference between FIGS. 9A and 8A (thus allowing a comparison between FIGS. 8C and 9B).

Figure 9A:
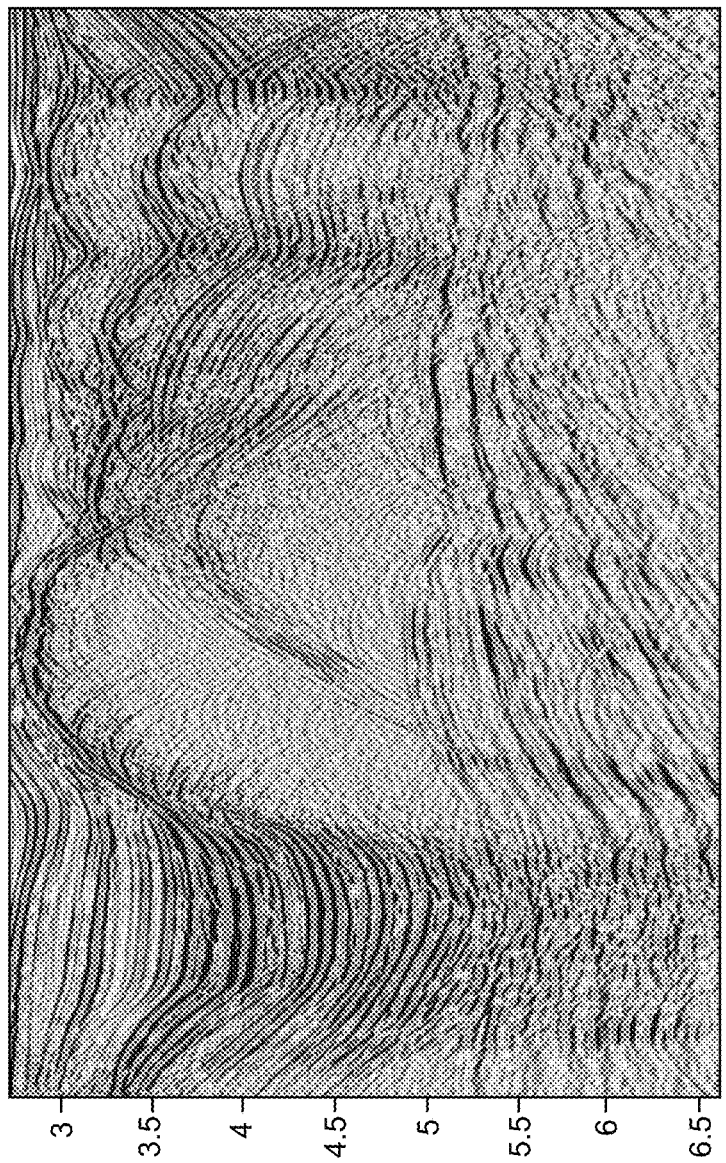
FIG. 9A illustrates the same data from FIG. 8A following processing using the inverse scattering series method.
Figure 9B:
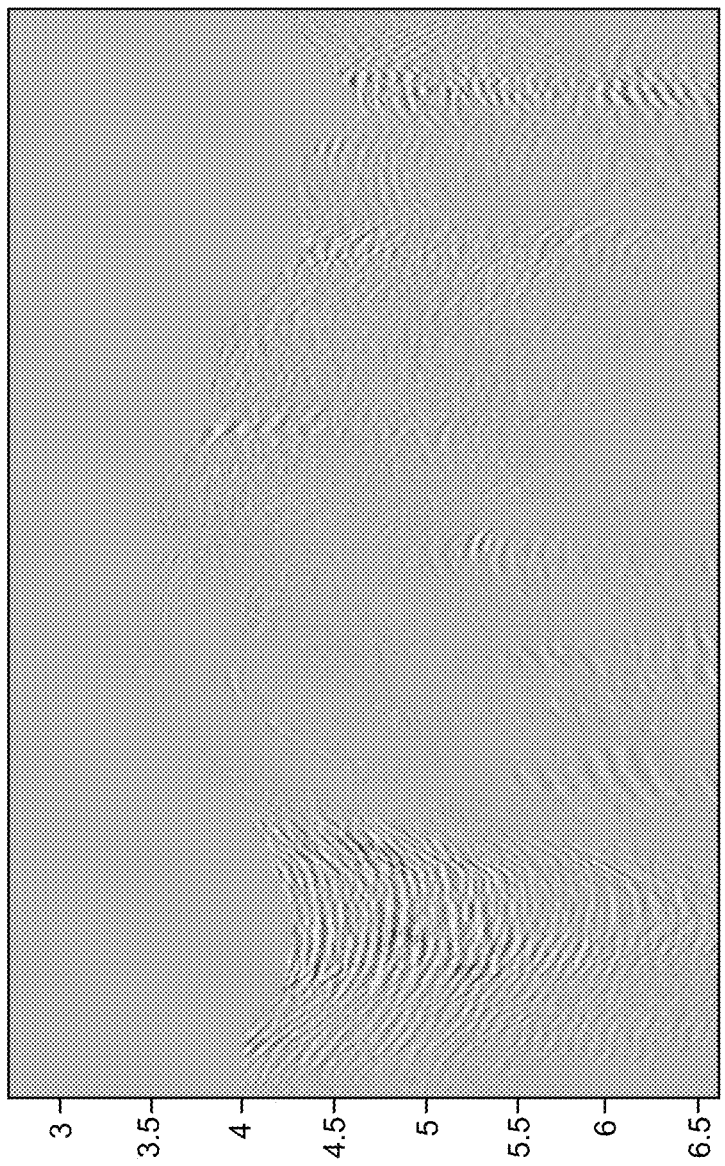
FIG. 9B illustrates the difference between FIGS. 9A and 8A.

The corresponding internal multiple attenuation results from the field data (developed using the method according to an exemplary embodiment, and using ISS) are displayed in FIGS. 8B and 9A, respectively, after the free-surface multiples had been removed using SRME. It can be seen from the difference plot of FIG. 8C and the difference plot of FIG. 9B that most of the internal multiples have been modeled and attenuated by both methods, although they are not as clear as in the case of synthetic data because the multiples are much weaker in the field data. Moreover, the noise in the input field data degrades the performance of prediction and subtraction. Extending use of the system and methods according to exemplary embodiments to a three dimensional operation can improve the accuracy of multiple modeling.

According to exemplary embodiments discussed herein, an approach based on iteratively locating the multiple-generating horizons has been provided for predicting internal multiples in seismic undersea exploration of hydrocarbon deposits. The systems and methods discussed herein according to the exemplary embodiments are an appropriate and cost-effective alternative for internal multiple attenuation without subsurface information.

Figure 10:
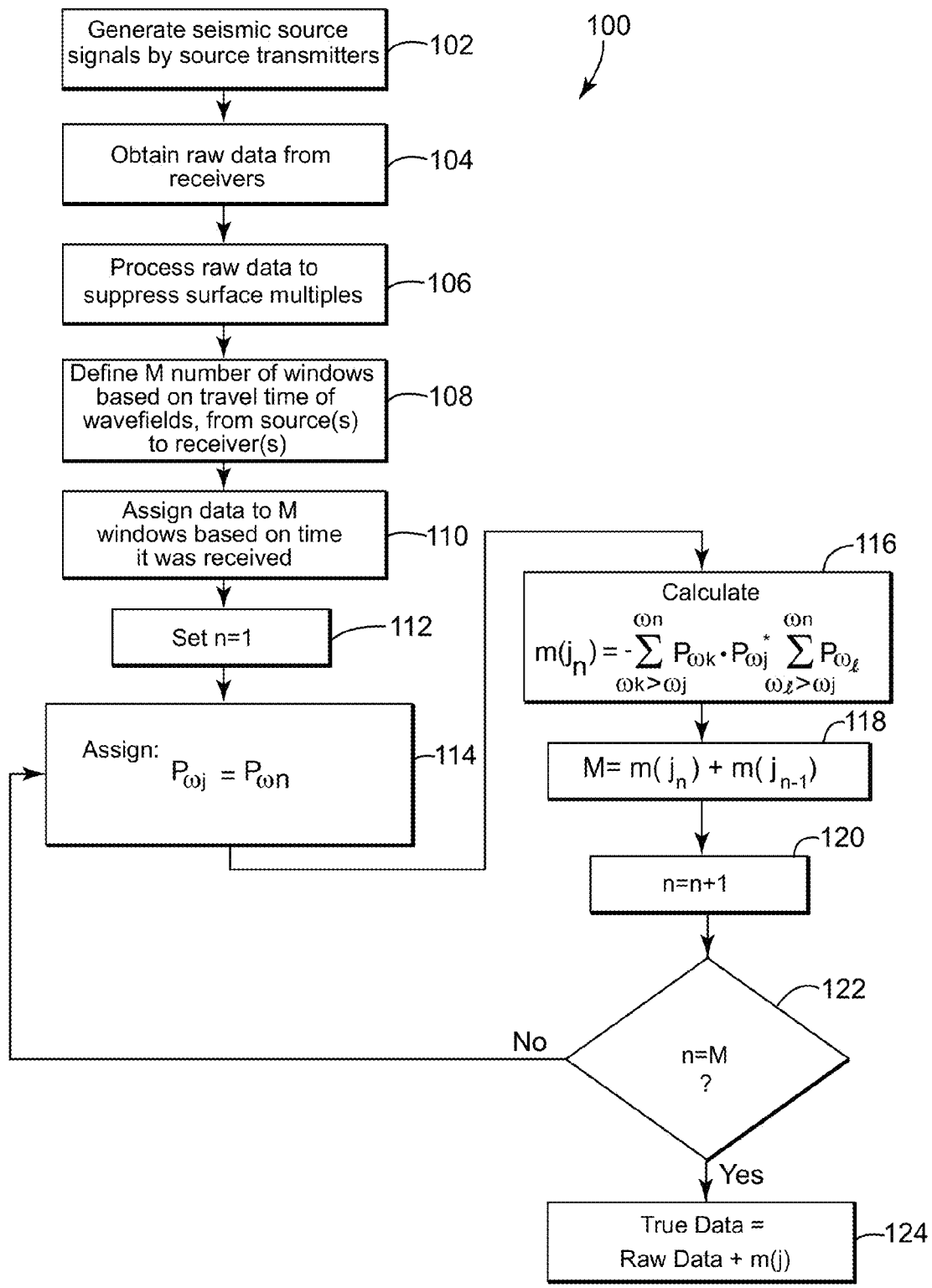
FIG. 10 illustrates a flow diagram of a method for substantially eliminating the influence of multiple reflections in determining undersea geography without the a priori knowledge of subsurface information according to an exemplary embodiment.

FIG. 10 illustrates a flow diagram of method 100 for substantially eliminating the influence of multiple reflections in determining undersea geography without the a priori knowledge of subsurface information according to an exemplary embodiment. Method 100 begins with step 102, in which seismic signals are generated by sources 4. In step 104, raw data is received from all of the receivers 14 and stored in an appropriate memory storage device. The raw data is processed in step 104 only to the extent that surface multiples are suppressed. According to an exemplary embodiment, one manner of suppressing surface multiples is SRME, discussed briefly above. Other known methods can include those such as Radon transform and wavefield modeling. In step 108, M windows are defined for the geographical area of interest. Windows are defined according to a length l and a depth d. According to an exemplary embodiment, the length of the window is important as the window length l must be less than the total distance between the first and last source 4. The depth of the window is determined based on the speed of sound in sea water, which can generally be presumed to be about 1500 meters-per-second. Thus the window size has both a time and length dimension. If ship 2 is about 1500 meters above the surface of the ocean, a sound wave will take about two seconds to travel from source 4 to ocean floor 42, and then back again to receiver 14. According to a first exemplary embodiment, each window can be defined to correspond to about 100 milliseconds. This corresponds to about 150 meters in depth, and there will be about ten windows between the ocean surface and the bottom of the ocean (thus M=10). However, those of ordinary skill in the art can appreciate that the window can be defined to be virtually any depth (i.e., time interval), wherein the limiting factors in deciding how many windows to implement can be sample size, processing speed and time, as well as memory storage limitations. In addition, however, there can also be constraints in terms of resolution of the sampled data, such that the window depth does approach a practical limitation based on analog-to-digital converter sampling rates, among other factors.

Following step 108, in which the M windows are defined, method 100 proceeds to step 110 in which the data is assigned to different windows according to the time of arrival. If, for example, there were 100 windows, $w_1$ through $w_{100}$, then one hundred wavefields would be reconstructed, and enumerated $P_{w1}$, $P_{w2}$, $P_{w3}$, up to $P_{w100}$. Later in the method, sets of three wavefields are correlated to $P_{wj}$, $P_{wk}$, and $P_{wl}$ and used in equation 2 to determine a set of internal multiples according to an exemplary embodiment. Next, in step 112, method 100 sets n=1, and proceeds to step 114, wherein $P_{wj}$ is set equal to $P_{w(n)}$. $P_{wj}$, therefore, is always the highest window, and $P_{wk}$, $P_{wl}$ are set to the lowest two windows, in accordance with the iteratively performed summation in accordance with Equation (2) as discussed in greater detail according to an exemplary embodiment below. In step 116, according to an exemplary embodiment, $m(j_n)$ is calculated according to a modified version of equation 2. In the accompanying flow diagram, FIG. 10, equation 2 is modified to remove the left-most summation, so that the calculation of M (wherein M is the internal multiple model, i.e., the data illustrating the resultant internal multiples 51) can be shown in a flow-diagram format; that is, the left-most summation, from $w_j$=1 to $w_j$=$w_n$, is represented by the iterative loop that computes the other summations for each defined window (discussed above), and the loop indicates that the summations are performed for each defined window according to an exemplary embodiment. In step 116, according to Equation (2), $P_{wj}$ is set equal to $P_{w(1)}$, and in a first iteration of Equation (2), $P_{wk}$ is set equal to $P_{w2}$, and $P_{wl}$ is also set equal to $P_{w2}$; then, the product is calculated, and $P_{w1}$ iterates from 2-100; following those series of product calculation, $P_{wk}$ iterates from 2-100, and for each iteration of $P_{wk}$, $P_{wl}$ also iterates from $P_{w2}$ through $P_{w100}$; in this manner, the summation within summation is manifested with iterative loops. See, also, the discussion immediately following the introduction of Equation (2) shown above.

Once $P_{wk}$ and $P_{wl}$ have been iteratively processed from n=2 through 100 (because for example purposes only M was set equal to 100), M is calculated (as discussed below) and then method 100, in step 118, determines the total multiples data field, M, according to the equation $$M = m(j_n) + m(j_{n-1});$$

this adds the previous window's wavefields to the new one, and repeats the iterative process until all of the defined windows' wavefields have been accumulated.

In step 120, method 100 adds 1 to n. In decision step 122, n is checked to determine if all of the wavefields have been used in determining the internal multiple 51 model M). All of the wavefield will have been used once n reaches M−1 (then, $P_{wj}$=$P_{w99}$, and $P_{wk}$ and $P_{wl}$ equal $P_{w100}$). If not ("No" path from decision step 122), method 100 returns to step 114, and the next set of wavefields for a new window are obtained from the window data memory. According to an exemplary embodiment, the uppermost wavefield, $W_j$, is the next window down ($w_{n+1}$), and when n=2, such that Pwj=Pw2, Pwk and Pw1 begin at Pw3 as previously discussed. Then, presuming not all of the window data has been utilized, the process of calculating the internal multiples M is performed again. If all of the wavefields for all of the windows have been taken into account in determining the internal multiple 51 model M, then method 100 continues to step 124 ("Yes" path from decision step 122), and the true data is determined by adding M to the raw data (actually a subtraction, because $m(j_n)$ is defined as being a negative of the summation), and the result is an actual depiction of the geographical area of interest with multiples reduced and/or substantially eliminated from received raw data.

According to a preferred exemplary embodiment, two criteria must be met in order to use method 100: first, the lower-higher-lower criteria discussed in greater detail above must be presumed to have been met, and second, the window length must be less than the separation between the multiple generators, or sources 14. That is, the window not only has a depth (in time, or meters), but also a distance (again in meters).

Disclosed within is a system and method that can predict internal multiples in marine or land seismic data without requiring a priori information about the subsurface of the earth. It is intended to be used after suppression of surface-related multiples. The system and method first separates the seismic data into different windows based on the travel time of the wavefield from the source to receivers. Then, a convolution is performed between the traces in the windows that are responsible for upward reflections of the internal multiples and correlation with the traces in the first time-window that are responsible for downward reflections of the corresponding internal multiples. By repeating the process that includes the subsequent time windows, all orders of all internal multiples can be predicted without any subsurface information. According to some embodiments, the window length can be different for the three windows wj, wk and wl, e.g., in practice, wk and wl can be sufficiently longer than wj.

Figure 11:
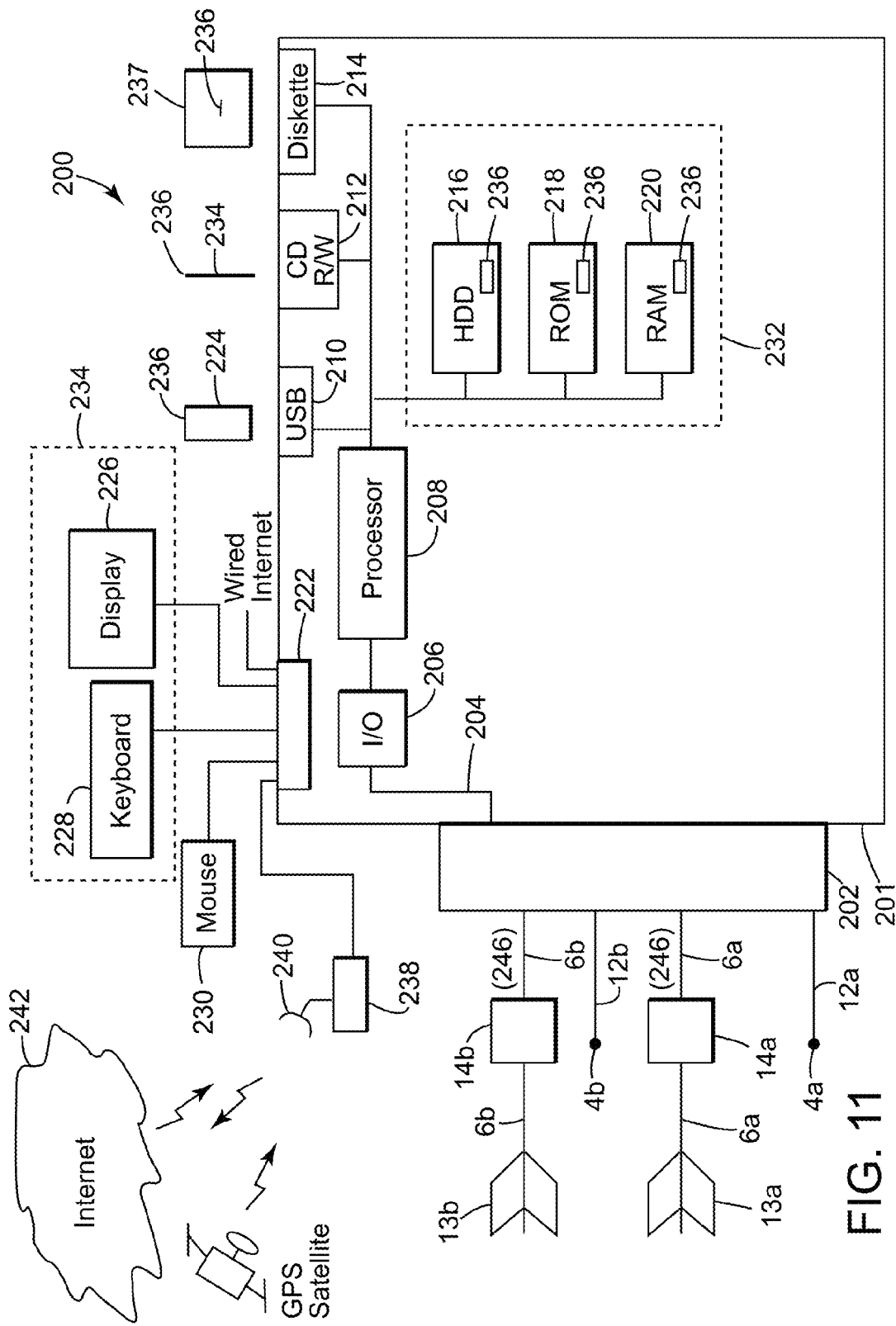
FIG. 11 illustrates a block diagram of a system that can implement the method shown and described in reference to FIG. 10 according to an exemplary embodiment.

FIG. 11 illustrates a seismic data acquisition system (system) 200 suitable for use to implement method 100 for substantially eliminating the influence of multiple reflections in determining undersea geography without the a priori knowledge of subsurface information according to an exemplary embodiment. System 200 includes, among other items, server 201, source/receiver interface 202, internal data/communications bus (bus) 204, processor(s) 208 (those of ordinary skill in the art can appreciate that in modern server systems, parallel processing is becoming increasingly prevalent, and whereas a single processor would have been used in the past to implement many or at least several functions, it is more common currently to have a single dedicated processor for certain functions (e.g., digital signal processors)), universal serial bus (USB) port 210, compact disk (CD)/digital versatile disk (DVD) read/write (R/W) drive 212, floppy diskette drive 214 (though less used currently, many servers still include this device), and data storage unit 232. Data storage unit 232 itself can comprise hard disk drive (HDD) 216 (these can include conventional magnetic storage media, but, as is becoming increasingly more prevalent, can include flash drive-type mass storage devices 224, among other types), read-only memory (ROM) device(s) 218 (these can include electrically erasable (EE) programmable ROM (EEPROM) devices, ultra-violet (UV) erasable PROM devices (UVPROMs), among other types), and random access memory (RAM) devices 220. Usable with USB port 210 is flash drive device 224, and usable with CD/DVD R/W device 212 are CD/DVD disks 234. Usable with diskette drive device 214 are floppy diskettes 237. Each of the memory storage devices, or the memory storage media (216, 218, 220, 224, 234, and 237, among other types), can contain parts or components, or in its entirety, executable software programming code (software) 236 software 236 that can implement the method described herein. Further, processor 208 itself can contain one or different types of memory storage devices (most probably, but not in a limiting manner, RAM memory storage media 220) that can store all or some of the components of software 236.

In addition to the above described components, system 200 also comprises user console 234, which can include keyboard 228, display 226, and mouse 230. All of these components are known to those of ordinary skill in the art, and this description includes all known and future variants of these types of devices. Display 226 can be any type of known display or presentation screen, such as liquid crystal displays (LCDs), plasma displays, cathode ray tubes (CRTs), among others. User console 234 can include one or more user interface mechanisms such as a mouse, keyboard, microphone, touch pad, touch screen, voice-recognition system, among other inter-active inter-communicative devices.

User console 234, and its components if separately provided, interface with server 201 via server input/output (I/O) interface 222, which can be an RS 232, Ethernet, USB or other type of communications port, or can include all or some of these, and further includes any other type of communications means, presently known or further developed. System 200 can further include communications satellite/global positioning system (GPS) transceiver device 238, to which is electrically connected at least one antenna 240 (according to an exemplary embodiment, there would be at least one GPS receive-only antenna, and at least one separate satellite bi-directional communications antenna). System 200 can access internet 242, either through a hard wired connection, via I/O interface 222 directly, or wirelessly via antenna 240, and transceiver 238.

Server 201 can be coupled to other computing devices, such as those that operate or control the equipment of ship 2, via one or more networks. Server 201 may be part of a larger network configuration as in a global area network (GAN) (e.g., internet 242), which ultimately allows connection to various landlines.

According to a further exemplary embodiment, system 200, being ostensibly designed for use in seismic exploration, will interface with one or more sources 4 and one or more receivers 14. These, as previously described, are attached to streamers 6, to which are also attached birds 13a,b that are useful to maintain positioning. As further previously discussed, sources 4 and receivers 14 can communicate with server 200 either through an electrical cable that is part of streamer 6, or via a wireless system that can communicate via antenna 240 and transceiver 238 (collectively described as communications conduit 246).

According to further exemplary embodiments, user console 234 (for example: a keyboard, buttons, switches, touch screen and/or joy stick) provides a means for personnel to enter commands and configuration into system 200. Display device 226 can be used to show: streamer 6 position, visual representations of acquired data, source 4 and receiver 14 status information, survey information and other information important to the seismic data acquisition process. Source and receiver interface unit 202 can receive the hydrophone seismic data, from receiver 14, though streamer communication conduit 248 (discussed above) that can be part of streamer 6, as well as streamer 6 position information from birds 13; the link is bi-directional so that commands can also be sent to birds 13 to maintain proper streamer positioning. Source and receiver interface unit 202 can also communicate bi-directionally with sources 4 through the streamer communication conduit 248 that can be part of streamer 6. Excitation signals, control signals, output signals and status information related to source 4 can be exchanged by streamer communication conduit 248 between system 200 and source 4.

Bus 204 allows a data pathway for things like: the transfer and storage of data that originate from either the source sensors or streamer receivers; for processor 208 to access stored data contained in data storage unit memory 232; for processor 208 to send information for visual display to the display 226; or for the user to send commands to system operating programs that might reside in either the processor 208 or the source and receiver interface unit 202.

System 200 can be used to implement method 100 for substantially eliminating the influence of multiple reflections in determining undersea geography without the a priori knowledge of subsurface information according to an exemplary embodiment. Hardware, firmware, software or a combination thereof may be used to perform the various steps and operations described herein. According to an exemplary embodiment, software 236 for carrying out the above discussed steps can be stored and distributed on multi-media storage devices such as devices 216, 218, 220, 224, 234, and/or 237 (described above). These storage media may be inserted into, and read by, devices such as USB port 210, CD/DVD R/W device 212, floppy drive 214, among others.

According to an exemplary embodiment, implementation of method 100 can occur in a dedicated processor 208. Those of ordinary skill in the art in the field of the embodiments can appreciate that such functionality can be designed into various types of circuitry, including, but not limited to field programmable gate array structures (FPGAs), application specific integrated circuitry (ASICs), microprocessor based systems, among other types. A detailed discussion of the various types of physical circuit implementations does not substantively aid in an understanding of the embodiments, and as such has been omitted for the dual purposes of brevity and clarity. However, as well known to those of ordinary skill in the art, the systems and methods discussed herein can be implemented as discussed, and can further include programmable devices.

Such programmable devices and/or other types of circuitry as previously discussed can include a processing unit, a system memory, and a system bus that couples various system components including the system memory to the processing unit. The system bus can be any of several types of bus structures including a memory bus or memory controller, a peripheral bus, and a local bus using any of a variety of bus architectures. Furthermore, various types of computer readable media can be used to store programmable instructions. Computer readable media can be any available media that can be accessed by the processing unit. By way of example, and not limitation, computer readable media can comprise computer storage media and communication media. Computer storage media includes volatile and nonvolatile as well as removable and non-removable media implemented in any method or technology for storage of information such as computer readable instructions, data structures, program modules or other data. Computer storage media includes, but is not limited to, RAM, ROM, EEPROM, flash memory or other memory technology, CDROM, DVDs or other optical disk storage, magnetic cassettes, magnetic tape, magnetic disk storage or other magnetic storage devices, or any other medium which can be used to store the desired information and which can be accessed by the processing unit. Communication media can embody computer readable instructions, data structures, program modules or other data in a modulated data signal such as a carrier wave or other transport mechanism and can include any suitable information delivery media.

The system memory can include computer storage media in the form of volatile and/or nonvolatile memory such as ROM and/or RAM. A basic input/output system (BIOS), containing the basic routines that help to transfer information between elements connected to and between the processor, such as during start-up, can be stored in memory. The memory can also contain data and/or program modules that are immediately accessible to and/or presently being operated on by the processing unit. By way of non-limiting example, the memory can also include an operating system, application programs, other program modules, and program data.

The processor can also include other removable/non-removable and volatile/nonvolatile computer storage media. For example, the processor can access a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. A hard disk drive can be connected to the system bus through a non-removable memory interface such as an interface, and a magnetic disk drive or optical disk drive can be connected to the system bus by a removable memory interface, such as an interface.

Exemplary embodiments discussed herein can also be embodied as computer-readable codes on a computer-readable medium. The computer-readable medium can include a computer-readable recording medium and a computer-readable transmission medium. The computer-readable recording medium is any data storage device that can store data which can be thereafter read by a computer system. Examples of the computer-readable recording medium include ROM, RAM, CDROMs and generally optical data storage devices, magnetic tapes, flash drives, and floppy disks. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to, when implemented in suitable electronic hardware, accomplish or support exercising certain elements of the appended claims can be readily construed by programmers skilled in the art to which the embodiments pertains.

The above-described exemplary embodiments are intended to be illustrative in all respects, rather than restrictive, of the present invention. Thus the present invention is capable of many variations in detailed implementation that can be derived from the description contained herein by a person skilled in the art. No element, act, or instruction used in the description of the present application should be construed as critical or essential to the invention unless explicitly described as such. Also, as used herein, the article "a" is intended to include one or more items.

We claim:

1. A method for substantially eliminating an influence of internal multiple reflections in determining undersea geography in a geographical area of interest without a priori knowledge of subsurface information, the method comprising:
    (a) generating a series of seismic signals by a plurality of source transmitters;
    (b) receiving raw data at a plurality of receivers based on the generated series of seismic signals;
    (c) creating a set of M windows that corresponds physically to a space below the plurality of receivers and includes a geographical area of interest;
    (d) assigning received raw data to respective ones of the set of windows based on received time of the raw data, to generate M window data frames, wherein a first uppermost window data frame incorporates raw data that corresponds to an uppermost wavefield closest to the plurality of receivers, and an $M^{th}$ window data frame incorporates raw data that corresponds to a lowermost wavefield farthest from the plurality of receivers;

(e) iteratively generating an internal multiple model, using a sliding set of three window data frames, wherein for each iteration, the internal multiple model includes a first product of a convolution of data from a first window data frame and a second window date frame, and a correlation of data from a third window data frame with the first product;

(f) summing all of the iteratively generated internal multiple models to create a complete internal multiple model, and continuing the summing until all of the window data frames have been used; and (g) subtracting the complete internal multiple model from the raw data to substantially eliminate the influence of internal multiples in determining the geography of the geographical area of interest.

2. The method according to claim 1, further comprising:
processing the raw data to suppress surface related multiples prior to generating the internal multiple model.

3. The method according to claim 2, wherein the step of processing to suppress surface related multiples comprises:
using a method of surface related multiple elimination to suppress the surface multiples.

4. The method according to claim 1, further wherein the step of determining the set of M windows is based on travel time of the series of seismic signals from the plurality of sources to the plurality of receivers, and further wherein each of the M window time frames is substantially similar in duration.

5. The method according to claim 1, wherein the step of generating an internal multiple model using window data from a first set of three window data frames includes performing the following equation:

$$M = -\sum_{w_j=1}^{w_n}\left(\sum_{w_k>w_j}^{w_n} P_{w_k} P_{w_j}^* \sum_{w_l>w_j}^{w_n} P_{w_l}\right),$$

wherein
in each iteratively defined set of three window data frames, a higher wavefield generated by data in the uppermost window data frame is defined as $Pw_j$, a first lower wavefield generated by data in the second window data frame is defined as $P_{w_k}$, and a second lower wavefield generated by data in the third window data frame is defined as $P_{w_l}$, and further wherein, $P_{w_j}$ is a source side wavefield that represents an downward reflection of an internal multiple reflected from the first window, $P_{w_k}$ is a source side wavefield that represents an upward reflection of an internal multiple reflected from the second window, and $P_{w_l}$ is an receiver side wavefield that represents a upward reflection of an internal multiple reflected from the third window.

6. The method according to claim 5, wherein each of the M windows has as length and depth component, and wherein the length component is less than or equal to a distance between a first source and a last source, and further wherein the depth component correlates to a first number of samples that correlates to a first depth in distance, and further wherein adjacent windows overlap by a second number of samples less than the first number of samples, which corresponds to an overlap in depth defined as a second depth, and still further wherein the second depth is less than the first depth, and still further wherein for an increasing value of M the depth of the window increases.

7. The method according to claim 5, wherein each of the plurality of sets of windows satisfies a pseudo-depth monotonicity condition of lower-higher-lower windows, wherein $Pw_j$ is a higher window, and $P_{w_k}$ and $P_{w_l}$ are both lower windows.

8. A system for substantially eliminating an influence of internal multiple reflections in determining undersea geography in a geographical area of interest without a priori knowledge of subsurface information, the system comprising:

(a) a plurality of source transmitters configured to generate a series of seismic signals;

(b) a plurality of receivers configured to receive raw data based on the generated series of seismic signals; and (c) a processor configured to,
create a set of M windows that corresponds physically to a space below the plurality of receivers and includes a geographical area of interest, assign received raw data to respective ones of the set of windows based on received time of the raw data, to generate M window data frames, wherein a first uppermost window data frame incorporates raw data that corresponds to an uppermost wavefield closest to the plurality of receivers, and an $M^{th}$ window data frame incorporates raw data that corresponds to a lowermost wavefield farthest from the plurality of receivers, iteratively generate an internal multiple model, using a sliding set of three window data frames, wherein for each iteration, the internal multiple model includes a first product of a convolution of data from a first window data frame and a second window date frame, and a correlation of data from a third window data frame with the first product, sum all of the iteratively generated internal multiple models to create a complete internal multiple model, and continuing the summing until all of the window data frames have been used, and subtract the complete internal multiple model from the raw data to substantially eliminate the influence of internal multiples in determining the geography of the geographical area of interest.

9. The system according to claim 8, wherein
the processor is further configured to process the raw data to suppress surface related multiples prior to generating the internal multiple model.

10. The system according to claim 9, wherein
the processor is further configured to suppress surface related multiples using a method of surface related multiple elimination.

11. The system according to claim 8, wherein
the processor is further configured to determine the set of M windows based on travel time of the series of seismic signals from the plurality of sources to the plurality of receivers, and further wherein each of the M window time frames is substantially similar in duration.

12. The system according to claim 8, wherein the processor is further configured to generate an internal multiple model using window data from a first set of three window data frames that includes performing the following equation:

$$M = -\sum_{w_j=1}^{w_n} \left( \sum_{w_k > w_j}^{w_n} P_{w_k} P_{w_j}^* \sum_{w_l > w_j}^{w_n} P_{w_l} \right),$$

wherein
in each iteratively defined set of three window data frames, a higher wavefield generated by data in the uppermost window data frame is defined as $Pw_j$, a first lower wavefield generated by data in the second window data frame is defined as $P_{w_k}$, and a second lower wavefield generated by data in the third window data frame is defined as $P_{w_l}$, and further wherein, $P_{w_j}$ is a source side wavefield that represents an downward reflection of an internal multiple reflected from the first window, $P_{w_k}$ is a source side wavefield that represents an upward reflection of an internal multiple reflected from the second window, and $P_{w_l}$ is an receiver side wavefield that represents a upward reflection of an internal multiple reflected from the third window.

13. The system according to claim 12, wherein each of the M windows has as length and depth component, and wherein the length component is less than or equal to a distance between a first source and a last source, and further wherein
the depth component correlates to a first number of samples that correlates to a first depth in distance, and further wherein
adjacent windows overlap by a second number of samples less than the first number of samples, which corresponds to an overlap in depth defined as a second depth, and still further wherein
the second depth is less than the first depth, and still further wherein
for an increasing value of M the depth of the window increases.

14. The system according to claim 12, wherein each of the plurality of sets of windows satisfies a pseudo-depth monotonicity condition of lower-higher-lower windows, wherein $Pw_j$ is a higher window, and $P_{w_k}$ and $P_{w_l}$ are both lower windows.

* * * * *